United States Patent
Kim et al.

(10) Patent No.: US 11,768,175 B1
(45) Date of Patent: Sep. 26, 2023

(54) ELECTROPHORETIC METHODS FOR SPATIAL ANALYSIS

(71) Applicant: 10x Genomics, Inc., Pleasanton, CA (US)

(72) Inventors: Hanyoup Kim, Pleasanton, CA (US); Augusto Manuel Tentori, Pleasanton, CA (US); Rajiv Bharadwaj, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 49 days.

(21) Appl. No.: 17/192,536

(22) Filed: Mar. 4, 2021

Related U.S. Application Data

(60) Provisional application No. 62/985,103, filed on Mar. 4, 2020.

(51) Int. Cl.
*G01N 27/447* (2006.01)

(52) U.S. Cl.
CPC .............................. *G01N 27/44713* (2013.01)

(58) Field of Classification Search
CPC .... G01N 27/44713; B03C 5/005; B03C 5/028
See application file for complete search history.

(56) References Cited

U.S. PATENT DOCUMENTS

| | | |
|---|---|---|
| 4,683,195 A | 7/1987 | Mullis |
| 4,683,202 A | 7/1987 | Mullis |
| 4,800,159 A | 1/1989 | Mullis |
| 4,883,867 A | 11/1989 | Lee |
| 4,965,188 A | 10/1990 | Mullis |
| 5,002,882 A | 3/1991 | Lunnen |
| 5,130,238 A | 7/1992 | Malek |
| 5,308,751 A | 5/1994 | Ohkawa |

(Continued)

FOREIGN PATENT DOCUMENTS

| | | | | |
|---|---|---|---|---|
| CA | 3054046 A1 | * | 3/2020 | ............. B01L 3/508 |
| CN | 1680604 | | 10/2005 | |

(Continued)

OTHER PUBLICATIONS

K.A. Carter, Porphyrin-phospholipid liposomes premeablizied by near-infrared light, Nat. Commun., 2014, 5:3546, p. 1-11. (Year: 2014).*

(Continued)

*Primary Examiner* — Caitlyn Mingyun Sun
(74) *Attorney, Agent, or Firm* — Fish & Richardson P.C.

(57) ABSTRACT

The present disclosure provides electrophoretic systems, methods and compositions for spatial analysis, which can serve to magnify or demagnify spatial resolution of analytes of interest that are captured using electrophoresis. Some implementations can use a diverging or converging electric field in an electrophoretic capture system. Such a divergent or convergent electric field, as opposed to a parallel electric field, can be generated by, for example, utilizing different sizes of electrodes associated with or imbedded in substrates. Also provided herein are electrophoretic systems, methods and compositions for spatial analysis, which can serve to selectively migrate one or more analytes from a region of interest in the biological sample for capture using electrophoresis.

24 Claims, 8 Drawing Sheets

(56) References Cited

U.S. PATENT DOCUMENTS

| | | |
|---|---|---|
| 5,321,130 A | 6/1994 | Yue |
| 5,410,030 A | 4/1995 | Yue |
| 5,436,134 A | 7/1995 | Haugland |
| 5,455,166 A | 10/1995 | Walker |
| 5,494,810 A | 2/1996 | Barany et al. |
| 5,503,980 A | 4/1996 | Cantor |
| 5,512,439 A | 4/1996 | Hornes |
| 5,512,462 A | 4/1996 | Cheng |
| 5,559,032 A | 9/1996 | Pomeroy |
| 5,582,977 A | 12/1996 | Yue |
| 5,599,675 A | 2/1997 | Brenner |
| 5,641,658 A | 6/1997 | Adams |
| 5,648,245 A | 7/1997 | Fire et al. |
| 5,658,751 A | 8/1997 | Yue |
| 5,716,825 A | 2/1998 | Hancock et al. |
| 5,750,341 A | 5/1998 | Macevicz |
| 5,763,175 A | 6/1998 | Brenner |
| 5,830,711 A | 11/1998 | Barany et al. |
| 5,837,832 A | 11/1998 | Chee et al. |
| 5,854,033 A | 12/1998 | Lizardi |
| 5,863,753 A | 1/1999 | Haugland |
| 5,871,921 A | 2/1999 | Landegren et al. |
| 5,912,148 A | 6/1999 | Eggerding |
| 6,013,440 A | 1/2000 | Lipshutz |
| 6,027,889 A | 2/2000 | Barany et al. |
| 6,060,240 A | 5/2000 | Kamb et al. |
| 6,083,761 A | 7/2000 | Kedar et al. |
| 6,130,073 A | 10/2000 | Eggerding |
| 6,143,496 A | 11/2000 | Brown |
| 6,153,389 A | 11/2000 | Haarer |
| 6,165,714 A | 12/2000 | Lane et al. |
| 6,210,891 B1 | 4/2001 | Nyren |
| 6,210,894 B1 | 4/2001 | Brennan |
| 6,214,587 B1 | 4/2001 | Dattagupta |
| 6,258,568 B1 | 7/2001 | Nyren |
| 6,266,459 B1 | 7/2001 | Walt |
| 6,274,320 B1 | 8/2001 | Rothberg |
| 6,300,063 B1 | 10/2001 | Lipshutz et al. |
| 6,309,824 B1 | 10/2001 | Drmanac |
| 6,344,316 B1 | 2/2002 | Lockhart |
| 6,355,431 B1 | 3/2002 | Chee |
| 6,368,801 B1 | 4/2002 | Faruqi |
| 6,401,267 B1 | 6/2002 | Drmanac |
| 6,404,907 B1 | 6/2002 | Gilchrist |
| 6,432,360 B1 | 8/2002 | Church et al. |
| 6,503,713 B1 | 1/2003 | Rana |
| 6,506,561 B1 | 1/2003 | Cheval et al. |
| 6,544,732 B1 | 4/2003 | Chee |
| 6,544,790 B1 | 4/2003 | Sabatini |
| 6,620,584 B1 | 9/2003 | Chee |
| 6,632,641 B1 | 10/2003 | Brennan |
| 6,673,620 B1 | 1/2004 | Loeffler |
| 6,737,236 B1 | 5/2004 | Pieken et al. |
| 6,770,441 B2 | 8/2004 | Dickinson |
| 6,773,886 B2 | 8/2004 | Kaufman |
| 6,787,308 B2 | 9/2004 | Balasubramanian |
| 6,800,453 B2 | 10/2004 | Labaer |
| 6,812,005 B2 | 11/2004 | Fan et al. |
| 6,828,100 B1 | 12/2004 | Ronaghi |
| 6,833,246 B2 | 12/2004 | Balasubramanian |
| 6,859,570 B2 | 2/2005 | Walt |
| 6,864,052 B1 | 3/2005 | Drmanac |
| 6,897,023 B2 | 5/2005 | Fu |
| 6,942,968 B1 | 9/2005 | Dickinson et al. |
| 7,057,026 B2 | 6/2006 | Barnes |
| 7,098,041 B2 | 8/2006 | Kaylor et al. |
| 7,115,400 B1 | 10/2006 | Adessi |
| 7,118,883 B2 | 10/2006 | Inoue |
| 7,166,431 B2 | 1/2007 | Chee et al. |
| 7,211,414 B2 | 5/2007 | Hardin |
| 7,255,994 B2 | 8/2007 | Lao |
| 7,258,976 B2 | 8/2007 | Mitsuhashi |
| 7,297,518 B2 | 11/2007 | Quake |
| 7,329,492 B2 | 2/2008 | Hardin |
| 7,361,488 B2 | 4/2008 | Fan et al. |
| 7,378,242 B2 | 5/2008 | Hurt |
| 7,393,665 B2 | 7/2008 | Brenner |
| 7,405,281 B2 | 7/2008 | Xu |
| 7,407,757 B2 | 8/2008 | Brenner |
| 7,537,897 B2 | 5/2009 | Brenner |
| 7,563,576 B2 | 7/2009 | Chee |
| 7,582,420 B2 | 9/2009 | Oliphant et al. |
| 7,601,498 B2 | 10/2009 | Mao |
| 7,635,566 B2 | 12/2009 | Brenner |
| 7,674,752 B2 | 3/2010 | He |
| 7,709,198 B2 | 5/2010 | Luo et al. |
| 7,754,429 B2 | 7/2010 | Rigatti |
| 7,776,567 B2 | 8/2010 | Mao |
| 7,803,943 B2 | 9/2010 | Mao |
| 7,910,304 B2 | 3/2011 | Drmanac |
| 7,955,794 B2 | 6/2011 | Shen et al. |
| 7,960,119 B2 | 6/2011 | Chee |
| 7,960,120 B2 | 6/2011 | Rigatti |
| 8,003,354 B2 | 8/2011 | Shen et al. |
| 8,148,068 B2 | 4/2012 | Brenner |
| 8,206,917 B2 | 6/2012 | Chee |
| 8,288,103 B2 | 10/2012 | Oliphant |
| 8,383,338 B2 | 2/2013 | Kitzman |
| 8,460,865 B2 | 6/2013 | Chee |
| 8,481,257 B2 | 7/2013 | Van Eijk |
| 8,603,743 B2 | 12/2013 | Liu et al. |
| 8,604,182 B2 | 12/2013 | Luo et al. |
| 8,815,512 B2 | 8/2014 | Van Eijk |
| 8,835,358 B2 | 9/2014 | Fodor |
| 8,911,945 B2 | 12/2014 | Van Eijk |
| 8,951,726 B2 | 2/2015 | Luo et al. |
| 8,951,781 B2 | 2/2015 | Reed |
| 9,062,348 B1 | 6/2015 | Van Eijk |
| 9,194,001 B2 | 11/2015 | Brenner |
| 9,290,808 B2 | 3/2016 | Fodor |
| 9,290,809 B2 | 3/2016 | Fodor |
| 9,328,383 B2 | 5/2016 | Van Eijk |
| 9,334,536 B2 | 5/2016 | Van Eijk |
| 9,371,598 B2 | 6/2016 | Chee |
| 9,506,061 B2 | 11/2016 | Brown et al. |
| 9,557,330 B2 | 1/2017 | Siciliano et al. |
| 9,582,877 B2 | 2/2017 | Fu |
| 9,593,365 B2 | 3/2017 | Frisen et al. |
| 9,644,204 B2 | 5/2017 | Hindson et al. |
| 9,702,004 B2 | 7/2017 | Van Eijk |
| 9,727,810 B2 | 8/2017 | Fodor et al. |
| 9,777,324 B2 | 10/2017 | Van Eijk |
| 9,783,841 B2 | 10/2017 | Nolan et al. |
| 9,834,814 B2 | 12/2017 | Peter et al. |
| 9,850,536 B2 | 12/2017 | Oliphant et al. |
| 9,868,979 B2 | 1/2018 | Chee et al. |
| 9,879,313 B2 | 1/2018 | Chee et al. |
| 10,002,316 B2 | 6/2018 | Fodor et al. |
| 10,023,907 B2 | 7/2018 | Van Eijk |
| 10,030,261 B2 | 7/2018 | Frisen et al. |
| 10,041,949 B2 | 8/2018 | Bendall et al. |
| 10,059,990 B2 | 8/2018 | Boyden et al. |
| 10,208,982 B2 | 2/2019 | Bannish et al. |
| 10,273,541 B2 | 4/2019 | Hindson et al. |
| 10,472,669 B2 | 11/2019 | Chee |
| 10,480,022 B2 | 11/2019 | Chee |
| 10,480,029 B2 | 11/2019 | Bent et al. |
| 10,494,667 B2 | 12/2019 | Chee |
| 10,550,429 B2 | 2/2020 | Harada et al. |
| 10,590,244 B2 | 3/2020 | Delaney et al. |
| 10,724,078 B2 | 7/2020 | Van Driel et al. |
| 10,774,372 B2 | 9/2020 | Chee et al. |
| 10,774,374 B2 | 9/2020 | Frisen et al. |
| 10,787,701 B2 | 9/2020 | Chee |
| 10,913,975 B2 | 2/2021 | So et al. |
| 10,914,730 B2 | 2/2021 | Chee et al. |
| 10,927,403 B2 | 2/2021 | Chee et al. |
| 10,961,566 B2 | 3/2021 | Chee |
| 11,008,607 B2 | 5/2021 | Chee |
| 11,046,996 B1 | 6/2021 | Chee et al. |
| 11,067,567 B2 | 7/2021 | Chee |
| 11,156,603 B2 | 10/2021 | Chee |
| 11,162,132 B2 | 11/2021 | Frisen et al. |
| 11,208,684 B2 | 12/2021 | Chee |

(56) References Cited

U.S. PATENT DOCUMENTS

| | | |
|---|---|---|
| 11,286,515 B2 | 3/2022 | Chee et al. |
| 11,293,917 B2 | 4/2022 | Chee |
| 11,299,774 B2 | 4/2022 | Frisen et al. |
| 11,313,856 B2 | 4/2022 | Chee |
| 11,332,790 B2 | 5/2022 | Chell et al. |
| 11,352,659 B2 | 6/2022 | Frisen et al. |
| 11,359,228 B2 | 6/2022 | Chee et al. |
| 11,365,442 B2 | 6/2022 | Chee |
| 11,371,086 B2 | 6/2022 | Chee |
| 11,384,386 B2 | 7/2022 | Chee |
| 11,390,912 B2 | 7/2022 | Frisen et al. |
| 11,401,545 B2 | 8/2022 | Chee |
| 11,407,992 B2 | 8/2022 | Dadhwal |
| 11,408,029 B2 | 8/2022 | Katiraee et al. |
| 11,434,524 B2 | 9/2022 | Ramachandran Iyer et al. |
| 11,479,809 B2 | 10/2022 | Frisen et al. |
| 11,479,810 B1 | 10/2022 | Chee |
| 11,492,612 B1 | 11/2022 | Dadhwal |
| 11,505,828 B2 | 11/2022 | Chell et al. |
| 11,512,308 B2 | 11/2022 | Gallant et al. |
| 11,519,022 B2 | 12/2022 | Chee |
| 11,519,033 B2 | 12/2022 | Schnall-Levin et al. |
| 11,519,138 B2 | 12/2022 | Meier |
| 11,535,887 B2 | 12/2022 | Gallant et al. |
| 11,542,543 B2 | 1/2023 | Chee |
| 11,560,587 B2 | 1/2023 | Chee |
| 11,560,592 B2 | 1/2023 | Chew et al. |
| 11,560,593 B2 | 1/2023 | Chell et al. |
| 2002/0040275 A1 | 4/2002 | Cravatt |
| 2002/0150909 A1 | 10/2002 | Stuelpnagel |
| 2002/0164611 A1 | 11/2002 | Bamdad |
| 2003/0017451 A1 | 1/2003 | Wang et al. |
| 2003/0022207 A1 | 1/2003 | Balasubramanian |
| 2003/0148335 A1 | 8/2003 | Shen et al. |
| 2003/0162216 A1 | 8/2003 | Gold |
| 2003/0175844 A1* | 9/2003 | Nadler ............... G01N 33/6851 435/23 |
| 2003/0215936 A1 | 11/2003 | Kallioniemi et al. |
| 2003/0224419 A1 | 12/2003 | Corcoran |
| 2003/0232348 A1 | 12/2003 | Jones et al. |
| 2003/0232382 A1 | 12/2003 | Brennan |
| 2004/0033499 A1 | 2/2004 | Ilsley et al. |
| 2004/0067492 A1 | 4/2004 | Peng et al. |
| 2004/0096853 A1 | 5/2004 | Mayer |
| 2004/0106110 A1 | 6/2004 | Balasubramanian |
| 2004/0112442 A1 | 6/2004 | Maerkl |
| 2005/0037393 A1 | 2/2005 | Gunderson et al. |
| 2005/0048580 A1 | 3/2005 | Labaer |
| 2005/0100900 A1 | 5/2005 | Kawashima et al. |
| 2005/0116161 A1* | 6/2005 | Hafeman ............ B01L 3/50255 250/282 |
| 2005/0130173 A1 | 6/2005 | Leamon et al. |
| 2005/0136414 A1 | 6/2005 | Gunderson et al. |
| 2005/0179746 A1 | 8/2005 | Roux et al. |
| 2005/0191656 A1 | 9/2005 | Drmanac et al. |
| 2005/0191698 A1 | 9/2005 | Chee et al. |
| 2005/0202433 A1 | 9/2005 | Van Beuningen |
| 2005/0227271 A1 | 10/2005 | Kwon |
| 2005/0260653 A1 | 11/2005 | LaBaer |
| 2006/0164490 A1 | 7/2006 | Kim et al. |
| 2006/0211001 A1 | 9/2006 | Yu et al. |
| 2006/0216775 A1 | 9/2006 | Burkart et al. |
| 2006/0263789 A1 | 11/2006 | Kincaid |
| 2007/0020640 A1 | 1/2007 | McCloskey et al. |
| 2007/0054288 A1 | 3/2007 | Su et al. |
| 2007/0099208 A1 | 5/2007 | Drmanac et al. |
| 2007/0116612 A1 | 5/2007 | Williamson |
| 2007/0128624 A1 | 6/2007 | Gormley et al. |
| 2007/0128656 A1 | 6/2007 | Agrawal |
| 2007/0172873 A1 | 7/2007 | Brenner et al. |
| 2007/0207482 A1 | 9/2007 | Church et al. |
| 2007/0254305 A1 | 11/2007 | Paik et al. |
| 2007/0269805 A1 | 11/2007 | Hogers |
| 2008/0009420 A1 | 1/2008 | Schroth et al. |
| 2008/0108804 A1 | 5/2008 | Hayashizaki et al. |
| 2008/0132429 A1 | 6/2008 | Perov et al. |
| 2008/0145616 A1 | 6/2008 | Gharib et al. |
| 2008/0160580 A1 | 7/2008 | Adessi et al. |
| 2008/0220434 A1 | 9/2008 | Thomas |
| 2008/0261204 A1 | 10/2008 | Lexow |
| 2008/0286795 A1 | 11/2008 | Kawashima et al. |
| 2009/0005252 A1 | 1/2009 | Drmanac et al. |
| 2009/0006002 A1 | 1/2009 | Honisch et al. |
| 2009/0018024 A1 | 1/2009 | Church et al. |
| 2009/0026082 A1 | 1/2009 | Rothberg et al. |
| 2009/0082212 A1 | 3/2009 | Williams |
| 2009/0099041 A1 | 4/2009 | Church et al. |
| 2009/0105959 A1 | 4/2009 | Braverman et al. |
| 2009/0117573 A1 | 5/2009 | Fu et al. |
| 2009/0127589 A1 | 5/2009 | Rothberg et al. |
| 2009/0155781 A1 | 6/2009 | Drmanac et al. |
| 2009/0233802 A1 | 9/2009 | Bignell et al. |
| 2009/0253581 A1 | 10/2009 | van Eijk et al. |
| 2009/0291854 A1 | 11/2009 | Weisinger-Mayr et al. |
| 2009/0312193 A1 | 12/2009 | Kim et al. |
| 2009/0321262 A1 | 12/2009 | Adachi et al. |
| 2010/0035249 A1 | 2/2010 | Hayashizaki et al. |
| 2010/0120097 A1 | 5/2010 | Matz et al. |
| 2010/0120098 A1 | 5/2010 | Grunenwald et al. |
| 2010/0145037 A1 | 6/2010 | Brive et al. |
| 2010/0159446 A1 | 6/2010 | Haff et al. |
| 2010/0282617 A1 | 11/2010 | Rothberg et al. |
| 2011/0028685 A1 | 2/2011 | Purkayastha et al. |
| 2011/0059436 A1 | 3/2011 | Hardin et al. |
| 2011/0244448 A1 | 10/2011 | Shirai et al. |
| 2011/0245111 A1 | 10/2011 | Chee |
| 2012/0135871 A1 | 5/2012 | van Eijk et al. |
| 2012/0202698 A1 | 8/2012 | van Eijk et al. |
| 2012/0202704 A1 | 8/2012 | Fan et al. |
| 2013/0052331 A1 | 2/2013 | Kram et al. |
| 2013/0096033 A1 | 4/2013 | Routenberg |
| 2013/0171621 A1 | 7/2013 | Luo et al. |
| 2014/0066318 A1 | 3/2014 | Frisen et al. |
| 2014/0270435 A1 | 9/2014 | Dunn |
| 2014/0274731 A1 | 9/2014 | Raymond et al. |
| 2014/0323330 A1 | 10/2014 | Glezer et al. |
| 2015/0000854 A1 | 1/2015 | Gann-Fetter et al. |
| 2015/0148239 A1 | 5/2015 | Jon |
| 2015/0219618 A1* | 8/2015 | Krishnan ............. C12Q 1/6837 506/13 |
| 2015/0292988 A1 | 10/2015 | Bharadwaj et al. |
| 2016/0033496 A1 | 2/2016 | Chou et al. |
| 2016/0108458 A1 | 4/2016 | Frei et al. |
| 2016/0138091 A1 | 5/2016 | Chee et al. |
| 2016/0145677 A1 | 5/2016 | Chee et al. |
| 2016/0253584 A1 | 9/2016 | Fodor et al. |
| 2016/0289740 A1 | 10/2016 | Fu et al. |
| 2016/0298180 A1 | 10/2016 | Chee |
| 2016/0299165 A1 | 10/2016 | Zhou |
| 2017/0016053 A1 | 1/2017 | Beechem et al. |
| 2017/0029875 A1 | 2/2017 | Zhang et al. |
| 2017/0067096 A1 | 3/2017 | Wassie et al. |
| 2017/0089811 A1 | 3/2017 | Tillberg et al. |
| 2017/0220733 A1 | 8/2017 | Zhuang et al. |
| 2017/0241911 A1 | 8/2017 | Rockel et al. |
| 2018/0051322 A1 | 2/2018 | Church et al. |
| 2018/0057873 A1 | 3/2018 | Zhou et al. |
| 2018/0095067 A1 | 4/2018 | Huff et al. |
| 2018/0104694 A1 | 4/2018 | Huff et al. |
| 2018/0104964 A1 | 4/2018 | Uemura et al. |
| 2018/0112261 A1 | 4/2018 | Van Driel et al. |
| 2018/0201980 A1 | 7/2018 | Chee et al. |
| 2018/0216161 A1 | 8/2018 | Chen et al. |
| 2018/0217094 A1 | 8/2018 | Herr et al. |
| 2018/0245142 A1 | 8/2018 | So et al. |
| 2018/0291439 A1 | 10/2018 | van Eijk et al. |
| 2018/0305681 A1 | 10/2018 | Jovanovich et al. |
| 2019/0055594 A1 | 2/2019 | Samusik et al. |
| 2019/0085383 A1 | 3/2019 | Church et al. |
| 2019/0161796 A1 | 5/2019 | Hauling et al. |
| 2019/0177777 A1 | 6/2019 | Chee |
| 2019/0177778 A1 | 6/2019 | Chee |
| 2019/0177789 A1 | 6/2019 | Hindson et al. |
| 2019/0194709 A1 | 6/2019 | Church et al. |

(56) References Cited

U.S. PATENT DOCUMENTS

| | | |
|---|---|---|
| 2019/0203275 A1 | 7/2019 | Frisen et al. |
| 2019/0233878 A1 | 8/2019 | Delaney et al. |
| 2019/0249226 A1 | 8/2019 | Bent et al. |
| 2019/0262831 A1 | 8/2019 | West et al. |
| 2019/0264268 A1 | 8/2019 | Frisen et al. |
| 2019/0271030 A1 | 9/2019 | Chee |
| 2019/0271031 A1 | 9/2019 | Chee |
| 2019/0300943 A1 | 10/2019 | Chee et al. |
| 2019/0300944 A1 | 10/2019 | Chee et al. |
| 2019/0300945 A1 | 10/2019 | Chee et al. |
| 2019/0309353 A1 | 10/2019 | Chee |
| 2019/0309354 A1 | 10/2019 | Chee |
| 2019/0309355 A1 | 10/2019 | Chee |
| 2019/0323071 A1 | 10/2019 | Chee |
| 2019/0323088 A1 | 10/2019 | Boutet et al. |
| 2019/0330617 A1 | 10/2019 | Church et al. |
| 2019/0338353 A1 | 11/2019 | Belgrader et al. |
| 2019/0367969 A1 | 12/2019 | Belhocine et al. |
| 2020/0002763 A1 | 1/2020 | Belgrader et al. |
| 2020/0024641 A1 | 1/2020 | Nolan et al. |
| 2020/0048690 A1 | 2/2020 | Chee |
| 2020/0063191 A1 | 2/2020 | Kennedy-Darling et al. |
| 2020/0063195 A1 | 2/2020 | Chee |
| 2020/0063196 A1 | 2/2020 | Chee |
| 2020/0071751 A1 | 3/2020 | Daugharthy et al. |
| 2020/0080136 A1 | 3/2020 | Zhang et al. |
| 2020/0109443 A1 | 4/2020 | Chee |
| 2020/0224244 A1 | 7/2020 | Nilsson et al. |
| 2020/0239946 A1 | 7/2020 | Dewal |
| 2020/0256867 A1 | 8/2020 | Hennek et al. |
| 2020/0277663 A1 | 9/2020 | Iyer |
| 2020/0277664 A1 | 9/2020 | Frenz |
| 2020/0299757 A1 | 9/2020 | Chee et al. |
| 2020/0325531 A1 | 10/2020 | Chee |
| 2020/0363408 A1 | 11/2020 | Chou et al. |
| 2020/0370095 A1 | 11/2020 | Farmer et al. |
| 2020/0399687 A1 | 12/2020 | Frisen et al. |
| 2020/0407781 A1 | 12/2020 | Schnall-Levin |
| 2021/0010068 A1 | 1/2021 | Chee et al. |
| 2021/0010070 A1 | 1/2021 | Schnall-Levin et al. |
| 2021/0095331 A1 | 4/2021 | Fan et al. |
| 2021/0123040 A1 | 4/2021 | Macosko et al. |
| 2021/0130881 A1 | 5/2021 | Cox |
| 2021/0140982 A1 | 5/2021 | Uytingco et al. |
| 2021/0150707 A1 | 5/2021 | Weisenfeld et al. |
| 2021/0155982 A1 | 5/2021 | Yin et al. |
| 2021/0158522 A1 | 5/2021 | Weisenfeld et al. |
| 2021/0172007 A1 | 6/2021 | Chee et al. |
| 2021/0189475 A1 | 6/2021 | Tentori et al. |
| 2021/0190770 A1 | 6/2021 | Delaney et al. |
| 2021/0198741 A1 | 7/2021 | Williams |
| 2021/0199660 A1 | 7/2021 | Williams et al. |
| 2021/0207202 A1 | 7/2021 | Chee |
| 2021/0214785 A1 | 7/2021 | Stoeckius |
| 2021/0222235 A1 | 7/2021 | Chee |
| 2021/0222241 A1 | 7/2021 | Bharadwaj |
| 2021/0222242 A1 | 7/2021 | Ramachandran Iyer |
| 2021/0222253 A1 | 7/2021 | Uytingco |
| 2021/0223227 A1 | 7/2021 | Stoeckius |
| 2021/0230584 A1 | 7/2021 | Mikkelsen et al. |
| 2021/0230681 A1 | 7/2021 | Patterson et al. |
| 2021/0230692 A1 | 7/2021 | Daugharthy et al. |
| 2021/0237022 A1 | 8/2021 | Bava |
| 2021/0238664 A1 | 8/2021 | Bava et al. |
| 2021/0238675 A1 | 8/2021 | Bava |
| 2021/0238680 A1 | 8/2021 | Bava |
| 2021/0247316 A1 | 8/2021 | Bava |
| 2021/0255175 A1 | 8/2021 | Chee et al. |
| 2021/0262018 A1 | 8/2021 | Bava et al. |
| 2021/0262019 A1 | 8/2021 | Alvarado Martinez et al. |
| 2021/0269864 A1 | 9/2021 | Chee |
| 2021/0270822 A1 | 9/2021 | Chee |
| 2021/0285036 A1 | 9/2021 | Yin et al. |
| 2021/0285046 A1 | 9/2021 | Chell et al. |
| 2021/0292748 A1 | 9/2021 | Frisen et al. |
| 2021/0292822 A1 | 9/2021 | Frisen et al. |
| 2021/0317510 A1 | 10/2021 | Chee et al. |
| 2021/0317524 A1 | 10/2021 | Lucero et al. |
| 2021/0324457 A1 | 10/2021 | Ramachandran Iyer et al. |
| 2021/0332424 A1 | 10/2021 | Schnall-Levin |
| 2021/0332425 A1 | 10/2021 | Pfeiffer et al. |
| 2021/0348221 A1 | 11/2021 | Chell et al. |
| 2022/0002791 A1 | 1/2022 | Frisen et al. |
| 2022/0003755 A1 | 1/2022 | Chee |
| 2022/0010367 A1 | 1/2022 | Ramachandran Iyer et al. |
| 2022/0017951 A1 | 1/2022 | Ramachandran Iyer et al. |
| 2022/0025446 A1 | 1/2022 | Shah |
| 2022/0025447 A1 | 1/2022 | Tentori et al. |
| 2022/0033888 A1 | 2/2022 | Schnall-Levin et al. |
| 2022/0049293 A1 | 2/2022 | Frenz et al. |
| 2022/0049294 A1 | 2/2022 | Uytingco et al. |
| 2022/0064630 A1 | 3/2022 | Bent et al. |
| 2022/0081728 A1 | 3/2022 | Williams |
| 2022/0090058 A1 | 3/2022 | Frisen et al. |
| 2022/0090175 A1 | 3/2022 | Uytingco et al. |
| 2022/0090181 A1 | 3/2022 | Gallant et al. |
| 2022/0098576 A1 | 3/2022 | Dadhwal |
| 2022/0098661 A1 | 3/2022 | Chew et al. |
| 2022/0106632 A1 | 4/2022 | Galonska et al. |
| 2022/0106633 A1 | 4/2022 | Engblom et al. |
| 2022/0112486 A1 | 4/2022 | Ramachandran Iyer et al. |
| 2022/0112545 A1 | 4/2022 | Chee |
| 2022/0119869 A1 | 4/2022 | Ramachandran Iyer et al. |
| 2022/0127659 A1 | 4/2022 | Frisen et al. |
| 2022/0127666 A1 | 4/2022 | Katiraee et al. |
| 2022/0127672 A1 | 4/2022 | Stoeckius |
| 2022/0145361 A1 | 5/2022 | Frenz et al. |
| 2022/0154255 A1 | 5/2022 | Chee et al. |
| 2022/0170083 A1 | 6/2022 | Khaled et al. |
| 2022/0195422 A1 | 6/2022 | Gallant et al. |
| 2022/0195505 A1 | 6/2022 | Frisen et al. |
| 2022/0196644 A1 | 6/2022 | Chee |
| 2022/0213526 A1 | 7/2022 | Frisen et al. |
| 2022/0241780 A1 | 8/2022 | Tentori et al. |
| 2022/0267844 A1 | 8/2022 | Ramachandran Iyer et al. |
| 2022/0282329 A1 | 9/2022 | Chell et al. |
| 2022/0290217 A1 | 9/2022 | Frenz et al. |
| 2022/0290219 A1 | 9/2022 | Chee |
| 2022/0298560 A1 | 9/2022 | Frisen et al. |
| 2022/0325325 A1 | 10/2022 | Chee et al. |
| 2022/0326251 A1 | 10/2022 | Uytingco et al. |
| 2022/0333171 A1 | 10/2022 | Chee |
| 2022/0333192 A1 | 10/2022 | Uytingco |
| 2022/0333195 A1 | 10/2022 | Schnall-Levin et al. |
| 2022/0334031 A1 | 10/2022 | Delaney et al. |
| 2022/0348905 A1 | 11/2022 | Dadhwal |
| 2022/0348992 A1 | 11/2022 | Stoeckius et al. |
| 2022/0356464 A1 | 11/2022 | Kim et al. |
| 2022/0364163 A1 | 11/2022 | Stahl et al. |
| 2022/0389491 A1 | 12/2022 | Chee |
| 2022/0389504 A1 | 12/2022 | Chew et al. |
| 2022/0403455 A1 | 12/2022 | Ramachandran Iyer et al. |
| 2022/0404245 A1 | 12/2022 | Chell et al. |
| 2023/0002812 A1 | 1/2023 | Stoeckius et al. |
| 2023/0014008 A1 | 1/2023 | Shastry |
| 2023/0034039 A1 | 2/2023 | Shahjamali |

FOREIGN PATENT DOCUMENTS

| | | |
|---|---|---|
| CN | 1981188 | 6/2007 |
| EP | 0961110 | 12/1999 |
| EP | 0901631 | 8/2004 |
| EP | 1878502 | 1/2008 |
| EP | 1923471 | 5/2008 |
| EP | 2002017 | 12/2008 |
| EP | 2881465 | 6/2015 |
| EP | 3013983 | 5/2016 |
| EP | 3013984 | 5/2016 |
| EP | 2350648 | 7/2017 |
| EP | 3511423 | 7/2019 |
| EP | 3541956 | 9/2019 |
| WO | WO 1989/010977 | 11/1989 |
| WO | WO 1991/006678 | 5/1991 |
| WO | WO 1995/025116 | 9/1995 |

(56) References Cited

FOREIGN PATENT DOCUMENTS

| | | |
|---|---|---|
| WO | WO 1995/035505 | 12/1995 |
| WO | WO 2002/059355 | 8/2002 |
| WO | WO 2002/077283 | 10/2002 |
| WO | WO 2003/002979 | 1/2003 |
| WO | WO 2003/010176 | 2/2003 |
| WO | WO 2005/007814 | 1/2005 |
| WO | WO-2006056861 A1 * 6/2006 ........... G01N 27/447 |  |
| WO | WO 2007/073171 | 6/2007 |
| WO | WO 2007/076726 | 7/2007 |
| WO | WO 2007/145612 | 12/2007 |
| WO | WO 2008/157801 | 12/2008 |
| WO | WO 2009/032167 | 3/2009 |
| WO | WO 2009/152928 | 12/2009 |
| WO | WO 2010/126614 | 11/2010 |
| WO | WO 2011/068088 | 6/2011 |
| WO | WO 2011/102903 | 8/2011 |
| WO | WO 2012/159089 | 11/2012 |
| WO | WO 2013/123442 | 8/2013 |
| WO | WO 2013/131962 | 9/2013 |
| WO | WO 2013/138510 | 9/2013 |
| WO | WO 2013/150082 | 10/2013 |
| WO | WO 2013/150083 | 10/2013 |
| WO | WO 2014/142841 | 9/2014 |
| WO | WO 2014/210223 | 12/2014 |
| WO | WO 2014/210225 | 12/2014 |
| WO | WO 2016/138496 | 9/2016 |
| WO | WO 2016/138500 | 9/2016 |
| WO | WO 2016/162309 | 10/2016 |
| WO | WO 2016/166128 | 10/2016 |
| WO | WO 2016/168825 | 10/2016 |
| WO | WO 2017/019456 | 2/2017 |
| WO | WO 2017/048871 | 3/2017 |
| WO | WO 2017/075293 | 5/2017 |
| WO | WO 2017/112957 | 6/2017 |
| WO | WO 2017/096158 | 7/2017 |
| WO | WO 2018/064640 | 4/2018 |
| WO | WO 2018/091676 | 5/2018 |
| WO | WO 2018/148471 | 8/2018 |
| WO | WO 2019/012005 | 1/2019 |
| WO | WO 2019/140334 | 7/2019 |
| WO | WO 2019/213254 | 11/2019 |
| WO | WO 2019/213294 | 11/2019 |
| WO | WO 2020/028194 | 2/2020 |
| WO | WO 2020/047002 | 3/2020 |
| WO | WO 2020/047004 | 3/2020 |
| WO | WO 2020/047005 | 3/2020 |
| WO | WO 2020/047010 | 3/2020 |
| WO | WO 2020/053655 | 3/2020 |
| WO | WO 2020/061064 | 3/2020 |
| WO | WO 2020/061066 | 3/2020 |
| WO | WO 2020/061108 | 3/2020 |
| WO | WO 2020/076979 | 4/2020 |
| WO | WO 2020/099640 | 5/2020 |
| WO | WO 2020/123301 | 6/2020 |
| WO | WO 2020/123305 | 6/2020 |
| WO | WO 2020/123309 | 6/2020 |
| WO | WO 2020/123311 | 6/2020 |
| WO | WO 2020/123316 | 6/2020 |
| WO | WO 2020/123317 | 6/2020 |
| WO | WO 2020/123318 | 6/2020 |
| WO | WO 2020/123319 | 6/2020 |
| WO | WO 2020/123320 | 7/2020 |
| WO | WO 2020/160044 | 8/2020 |
| WO | WO 2020/176788 | 9/2020 |
| WO | WO 2020/190509 | 9/2020 |
| WO | WO 2020/198071 | 10/2020 |
| WO | WO 2020/206285 | 10/2020 |
| WO | WO 2020/219901 | 10/2020 |
| WO | WO 2020/243579 | 12/2020 |
| WO | WO 2021/016379 | 1/2021 |
| WO | WO 2021/041974 | 3/2021 |
| WO | WO 2021/067246 | 4/2021 |
| WO | WO 2021/067514 | 4/2021 |
| WO | WO 2021/091611 | 5/2021 |
| WO | WO 2021/092433 | 5/2021 |
| WO | WO 2021/097255 | 5/2021 |
| WO | WO 2021/102003 | 5/2021 |
| WO | WO 2021/102005 | 5/2021 |
| WO | WO 2021/102039 | 5/2021 |
| WO | WO 2021/133845 | 7/2021 |
| WO | WO 2021/133849 | 7/2021 |
| WO | WO 2021/142233 | 7/2021 |
| WO | WO 2021/168261 | 8/2021 |
| WO | WO 2021/168278 | 8/2021 |
| WO | WO 2021/216708 | 10/2021 |
| WO | WO 2021/225900 | 11/2021 |
| WO | WO 2021/236625 | 11/2021 |
| WO | WO 2021/236929 | 11/2021 |
| WO | WO 2021/237056 | 11/2021 |
| WO | WO 2021/237087 | 11/2021 |
| WO | WO 2021/242834 | 12/2021 |
| WO | WO 2021/247543 | 12/2021 |
| WO | WO 2021/247568 | 12/2021 |
| WO | WO 2021/252499 | 12/2021 |
| WO | WO 2021/252576 | 12/2021 |
| WO | WO 2021/252591 | 12/2021 |
| WO | WO 2021/252747 | 12/2021 |
| WO | WO 2021/263111 | 12/2021 |
| WO | WO 2022/025965 | 2/2022 |
| WO | WO 2022/060798 | 3/2022 |
| WO | WO 2022/060953 | 3/2022 |
| WO | WO 2022/061152 | 3/2022 |
| WO | WO 2022/087273 | 4/2022 |
| WO | WO 2022/099037 | 5/2022 |
| WO | WO 2022/109181 | 5/2022 |
| WO | WO 2022/140028 | 6/2022 |
| WO | WO 2022/147005 | 7/2022 |
| WO | WO 2022/147296 | 7/2022 |
| WO | WO 2022/164615 | 8/2022 |
| WO | WO 2022/178267 | 8/2022 |
| WO | WO 2022/198068 | 9/2022 |
| WO | WO 2022/221425 | 10/2022 |
| WO | WO 2022/226057 | 10/2022 |
| WO | WO 2022/236054 | 11/2022 |
| WO | WO 2022/256503 | 12/2022 |
| WO | WO 2022/271820 | 12/2022 |
| WO | WO 2023/287765 | 1/2023 |

OTHER PUBLICATIONS

U.S. Appl. No. 16/353,937, filed Mar. 14, 2019, Frisen et al.
U.S. Appl. No. 17/707,189, filed Mar. 29, 2022, Chell et al.
Borm et al., "Scalable in situ single-cell profiling by electrophoretic capture of mRNA," bioRxiv, Jan. 2022, 32 pages.
Chen et al., "Gray-scale photolithography using microfluidic photomasks," PNAS, Feb. 2003, 100(4):1499-1504.
Dalma-Weiszhausz et al., "The affymetrix GeneChip platform: an overview," Methods Enzymol., 2006, 410:3-28.
Miller et al., "Chapter 11—Solid and Suspension Microarrays for Microbial Diagnostics," Methods in Microbiology, 2015, 42:395-431.
Vickovic et al., "SM-Omics: An automated Platform for High-Throughput Spatial Multi-Omics," bioRxiv, Oct. 2020, 40 pages.
assets.ctassets.net [online], "Technical Note—Visium Spatial Gene Expression Imaging Guidelines," CG000241 Rev A, 2019, retrieved on Jul. 29, 2022, retrieved from URL <https://assets.ctfassets.net/an68im79xiti/76JHgFQo6aLq8UPyfL0u2c/fc39e46f86bf75676d3f7da6dc721fad/CG000241_VisiumImaging-GuidelinesTN_Rev_A.pdf>, 8 pages.
Burgess, "Spatial transcriptomics coming of age," Nat Rev Genet., Jun. 2019, 20(6):317, 1 page.
Cardona et al., "TrakEM2 0.9a User Manual," Sep. 8, 2011, retrieved on Jul. 29, 2022, retreieved from URL <https://www.ini.uzh.ch/~acardona/trakem2_manual.html>, 38 pages.
github.com [online], "ST Spot Detector Usage Guide: A Guide to Using the Spatial Transcriptomics Spot Detector 2.0," Jun. 2018, retrieved on Jul. 29, 2022, retrieved from URL <https://github.com/SpatialTranscriptomicsResearch/st_spot_detector/wiki/ST-Spot-Detector-Usage-Guide, 6 pages.
Navarro et al., "ST viewer: a tool for analysis and visualization of spatial transcriptomics datasets: Supplementary Information," Bioinformatics, Mar. 2019, 1058-1060.

(56) References Cited

OTHER PUBLICATIONS

Wilbrey-Clark et al., "Cell Atlas technologies and insights into tissue architecture," Biochemical Journal, Apr. 2020, 477(8):1427-1442.
Wong et al., "ST Spot Detector: a web-based application for automatic spot and tissue detection for spatial Transcriptomics image datasets," Bioinformatics, Jan. 2018, 34(11):1966-1968.
Asp et al., "Spatially Resolved Transcriptomes—Next Generation Tools for Tissue Exploration," Bioessays, Oct. 2020, 42(10):e1900221, 16 pages.
Bergenstråhle et al., "Seamless integration of image and molecular analysis for spatial transcriptomics workflows," BMC Genomics, Jul. 2020, 21(1):482, 7 pages.
Bolotin et al., "MiXCR: software tor comprehensive adaptive immunity profiling," Nat Methods., May 2015, 12(5):380-1.
U.S. Appl. No. 63/033,348, filed Jun. 2, 2020, Bent.
Borm et al., "High throughput Human embryo spatial transcriptome mapping by surface transfer of tissue RNA," Abstracts Selected Talks, Single Cell Genomics mtg, (SCG2019), 2019, 1 pages (Abstract Only).
Chen et al., "Large field of view-spatially resolved transcriptomics at nanoscale resolution," bioRxiv, Jan. 19, 2021, retrieved from URL <https://www.biorxiv.org/node/1751045.abstract>, 37 pages.
Cho et al., "Seq-Scope: Submicrometer-resolution spatial transcriptomics for single cell and subcellular studies," bioRxiv, Jan. 27, 2021, retrieved from URL <https://www.biorxiv.org/node/1754517.abstract>, 50 pages.
Codeluppi et al., "Spatial organization of the somatosensory cortex revealed by osmFISH," Nature Methods, Nov. 2018, 15:932-935.
Eng et al., "Transcriptome-scale super-resolved imaging in tissues by RNA seqFISH+," Nature, Apr. 2019, 568(7751):235-239, 37 pages.
Gamper et al., "Gene expression profile of bladder tissue of patients with ulcerative interstitial cystitis," BMC Genomics, Apr. 28, 2009, 10(199):1-17.
Goh et al., "Highly Specific Multiplexed RNA Imaging in Tissues With Split-FISH," Nat Methods, Jun. 15, 2020, 17(7):689-693, 21 pages.
Liu et al., "High-Spatial-Resolution Multi-Omics Sequencing via Deterministic Barcoding in Tissue," Cell, Nov. 13, 2020, 183(6):1665-1681, 36 pages.
Liu et al., "Spatial transcriptome sequencing of FFPE tissues at cellular level," bioRxiv 788992, Oct. 14, 2020, 39 pages.
Takei et al., "Integrated Spatial Genomics Reveals Global Architecture of Single Nuclei," Nature, Jan. 27, 2021, 590(7845):344-350, 53 pages.
Xia et al., "Spatial transcriptome profiling by MERFISH reveals subcellular RNA compartmentalization and cell cycle-dependent gene expression", Proceedings of the National Academy of Sciences, Sep. 2019, 116(39):19490-19499.
U.S. Appl. No. 16/876,709, filed May 18, 2020, Schnall-Levin et al.
U.S. Appl. No. 61/839,313, filed Jun. 25, 2013, Chee et al.
U.S. Appl. No. 61/839,320, filed Jun. 25, 2013, Chee et al.
[No Author Listed], "ChromiumNext GEM Single Cell 3' Reagent Kits v3.1—User Guide," 10x Genomics, Document No. CG000204, Nov. 2019, 58 pages.
[No Author Listed], "Chromium Next GEM Single Cell 3' Reagent Kits v3.1 (Dual Index)—User Guide," 10x Genomics, Mar. 2021, Document No. CG000315, 61 pages.
[No Author Listed], "HuSNP Mapping Assay User's Manual," Affymetrix Part No. 90094 (Affymetrix, Santa Clara, Calif.), GeneChip, 2000, 104 pages.
[No Author Listed], "Microarray technologies have excellent possibilities in genomics-related researches," Science Tools From Amersham Pharmacia Biotech, 1998, 3(4): 8 pages (with English Translation).
10xGenomics.com, [online], "Visium Spatial Gene Expression Reagent Kits—Tissue Optimization—User Guide," Jul. 2020, retrieved on May 25, 2021, retrieved from URL<https://assets.ctfassets.net/an68im79xiti/5UJrN0cH17rEk0UXwd19It/e54d99fb08a8f1500aba503005a04a56/CG000238_VisiumSpatialTissueOptimizationUserGuide_RevD.pdf>, 42 pages.
10xGenomics.com, [online], "Visium Spatial Gene Expression Reagent Kits—Tissue Optimization," Nov. 2019, retrieved on Jan. 25, 2022, retrieved from URL<https://assets.ctfassets.net/an68im79xiti/4q03w6959AJFxffSw51ee9/6a2ac61cf6388a72564eeb96bc294967/CG000238_VisiumSpatialTissueOptimizationUserGuide_Rev_A.pdf>, 46 pages.
10xGenomics.com, [online], "Visium Spatial Gene Expression Reagent Kits—Tissue Optimization," Oct. 2020, retrieved on Dec. 28, 2021, retrieved from URL<https://assets.ctfassets.net/an68im79xiti/5UJrN0cH17rEk0UXwd19It/e54d99fb08a8f1500aba503005a04a56/CG000238_VisiumSpatialTissueOptimizationUserGuide_RevD.pdf>, 43 pages.
10xGenomics.com, [online], "Visium Spatial Gene Expression Reagent Kits—User Guide," Jun. 2020, retrieved on May 25, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 69 pages.
10xGenomics.com, [online], "Visium Spatial Gene Expression Reagent Kits—User Guide," Oct. 2020, retrieved on Dec. 28, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 70 pages.
Adessi et al., "Solid phase DNA amplification: characterisation of primer attachment and amplification mechanisms," Nucl. Acids Res., 2000, 28(20):E87, 8 pages.
Affymetrix, "GeneChip Human Genome U133 Set," retrieved from the Internet: on the World Wide Web at affymetrix.com/support/technical/datasheets/hgu133_datasheet.pdf, retrieved on Feb. 26, 2003, 2 pages.
Affymetrix, "Human Genome U95Av2," Internet Citation, retrieved from the internet: on the World Wide Web affymetrix.com, retrieved on Oct. 2, 2002, 1 page.
Albretsen et al., "Applications of magnetic beads with covalently attached oligonucleotides in hybridization: Isolation and detection of specific measles virus mRNA from a crude cell lysate," Anal. Biochem., 1990, 189(1):40-50.
Allawi et al., "Thermodynamics and NMR of Internal GâT Mismatches in DNA," Biochemistry, 1996, 36(34):10581-10594.
Angenendt et al., "Cell-free Protein expression and functional assay in a nanowell chip format," Analytical Chemistry, 2004, 76(7):1844-49.
Angenendt et al., "Generation of High Density Protein Microarrays by Cell-free in Situ Expression of Unpurified PCR Products," Molecular and Cellular Proteomics, (2006) Ch. 5.9, pp. 1658-1666.
Armani et al, "2D-PCR: a method of mapping DNA in tissue sections," Lab Chip, 2009, 9(24):3526-34.
Atkinson et al., "An Updated Protocol for High Throughput Plant Tissue Sectioning," Front Plant Sci, 2017, 8:1721, 8 pages.
Atkinson, "Overview of Translation: Lecture Manuscript," U of Texas, 2000, DD, pp. 6.1-6.8.
Bains et al., "A novel method for nucleic acid sequence determination," Journal of Theoretical Biology, 1988, 135(3), 303-7.
Barnes, "PCR amplification of up to 35-kb DNA with high fidelity and high yield from lambda bacteriophage templates," Proc. Natl. Acad. Sci USA, 1994, 91(6):2216-2220.
Baugh et al., "Quantitative analysis of mRNA amplification by in vitro transcription," Nucleic Acids Res., 2001, 29(5):e29, 9 pages.
Beattie et al., "Advances in genosensor research," Clin Chem., May 1995, 41(5):700-6.
Beechem et al., "High-Plex Spatially Resolved RNA and Protein Detection Using Digital Spatial Profiling: A Technology Designed for Immuno-oncology Biomarker Discovery and Translational Research," Methods Mol Biol, 2020, Chapter 25, 2055:563-583.
Birney et al., "Identification and analysis of functional elements in 1% of the human genome by the ENCODE pilot project," Nature, 2007, 447(7146):799-816.
Blanchard et al., "High-density oligonucleotide arrays," Biosensors & Bioelectronics, 1996, 11(6-7):687-690.

(56) References Cited

OTHER PUBLICATIONS

Blokzijl et al., "Profiling protein expression and interactions: proximity ligation as a tool for personalized medicine," J Intern. Med., 2010, 268(3):232-245.
Blow, "Tissue Issues," Nature, 2007, 448(7156):959-962.
Brandon et al., "Mitochondrial mutations in cancer," Oncogene, 2006, 25(34):4647-4662.
Brenner et al., "Gene expression analysis by massively parallel signature sequencing (MPSS) on microbead arrays," Nat. Biotech., 2000, 18(6):630-634.
Brenner et al., "In vitro cloning of complex mixtures of DNA on microbeads: physical separation of differentially expressed cDNAs," Proc. Natl. Acad. Sci. USA, 2000, 97(4):1665-1670.
Brow, "35—The Cleavase I enzyme for mutation and polymorphism scanning," PCR Applications Protocols for Functional Genomics, 1999, pp. 537-550.
Brown et al., "Retroviral integration: structure of the initial covalent product and its precursor, and a role for the viral IN protein," Proc Natl Acad Sci USA, Apr. 1989, 86(8):2525-9.
Buenrostro et al., "Transposition of native chromatin for multimodal regulatory analysis and personal epigenomics," Nat Methods, Dec. 2013, 10(12):1213-1218.
Bullard et al., "Direct comparison of nick-joining activity of the nucleic acid ligases from bacteriophage T4," Biochem. J. 2006, 398(1):135-144.
Burgess, "A space for transcriptomics," Nature Reviews Genetics, 2016, 17(8):436-7.
Burgess, "Finding structure in gene expression," Nature Reviews Genetics, 2018, 19(5):249, 1 page.
Burns et al., "Well-less, gel-permeation formats for ultra-HTS," DDT, 2001, 6(12):S40-S47.
Burton et al., "Coverslip Mounted-Immersion Cycled in Situ RT-PCR for the Localization of mRNA in Tissue Sections," Biotechniques, 1998, 24(1):92-100.
Cha et al., "Specificity, efficiency, and fidelity of PCR," Genome Res., 1993, 3(3):S18-29.
Chandra et al., "Cell-free synthesis-based protein microarrays and their applications," Proteomics, 2009, 5(6):717-30.
Chatterjee et al., "Mitochondrial DNA mutations in human cancer. Oncogene," 2006, 25(34):4663-4674.
Chen et al., "RNA imaging. Spatially resolved, highly multiplexed RNA profiling in single cells," Science, Apr. 2015, 348(6233):aaa6090, 21 pages.
Chen et al., "Spatial Transcriptomics and In Situ Sequencing to Study Alzheimer's Disease," Cell, Aug. 2020, 182(4):976-991.
Chen et al., "µCB-seq: microfluidic cell barcoding and sequencing for high-resolution imaging and sequencing of single cells," Lab Chip, Nov. 2020, 20(21):3899-3913.
Constantine et al., "Use of genechip high-density oligonucleotide arrays for gene expression monitoring," Life Sceience News, Amersham Life Science, 1998, pp. 11-14.
Credle et al., "Multiplexed analysis of fixed tissue RNA using Ligation in situ Hybridization," Nucleic Acids Research, 2017, 45(14):e128, 9 pages.
Crosetto et al., "Spatially resolved transcriptomics and beyond," Nature Review Genetics, 2015, 16(1):57-66.
Czarnik, "Encoding methods for combinatorial chemistry," Curr Opin Chem Biol., Jun. 1997, 1(1):60-6.
Dahl et al., "Circle-to-circle amplification for precise and sensitive DNA analysis," Proc. Natl. Acad. Sci., 2004, 101(13):4548-4553.
Daubendiek et al., "Rolling-Circle RNA Synthesis: Circular Oligonucleotides as Efficient Substrates for T7 RNA Polymerase," J. Am. Chem. Soc., 1995, 117(29):7818-7819.
Davies et al., "How best to identify chromosomal interactions: a comparison of approaches," Nat. Methods, 2017, 14(2):125-134.
Dean et al., "Comprehensive human genome amplification using multiple displacement amplification," Proc Natl. Acad. Sci. USA, 2002, 99(8):5261-66.

Duncan et al., "Affinity chromatography of a sequence-specific DNA binding protein using Teflon-linked oligonucleotides," Anal. Biochem., 1988, 169(1):104-108.
Eguiluz et al., "Multitissue array review: a chronological description of tissue array techniques, applications and procedures," Pathology Research and Practice, 2006, 202(8):561-568.
Eldridge et al., "An in vitro selection strategy for conferring protease resistance to ligand binding peptides," Protein Eng Des Sel., 2009, 22(11):691-698.
Ellington et al., "Antibody-based protein multiplex platforms: technical and operational challenges," Clin Chem, 2010, 56(2):186-193.
Fahy et al., "Design and synthesis of polyacrylamide-based oligonucleotide supports for use in nucleic acid diagnostics," Nucleic Acids Res., Apr. 1993, 21(8):1819-26.
Fan et al., "Highly parallel SNP genotyping," Cold Spring Symp. Quant. Biol., 68: 69-78, 2003.
Fire et al., "Rolling replication of short DNA circles," Proc. Natl. Acad. Sci., 1995, 92(10):4641-4645.
Fodor et al., "Light-directed, spatially addressable parallel chemical synthesis," Science, 1995, 251(4995):767-773.
Forster et al., "A human gut bacterial genome and culture collection for improved metagenomic analyses," Nature Biotechnology, 2019, 37(2):186-192.
Frese et al., "Formylglycine aldehyde Tag—protein engineering through a novel post-translational modification," ChemBioChem., 2009, 10(3):425-27.
Fu et al., "Counting individual DNA molecules by the stochastic attachment of diverse labels," PNAS, 2011, 108(22):9026-9031.
Fu et al., "Continuous Polony Gels for Tissue Mapping with High Resolution and RNA Capture Efficiency," bioRxiv, 2021, 20 pages.
Fullwood et al., "Next-generation DNA sequencing of paired-end tags (PET) for transcriptome and genome analyses," Genome Res., 2009, 19(4):521-532.
Ganguli et al., "Pixelated spatial gene expression analysis from tissue," Nat Commun., Jan. 2018, 9(1):202, 9 pages.
Gao et al., "High density peptide microarrays. In situ synthesis and applications," Molecular Diversity, 8, 177-187, 2004.
Gao et al., "Q&A: Expansion microscopy", BMC Biology, 15:50, 9 pages, 2017.
Gene@arrays[online], BeadArray Technology, available on or before Feb. 14, 2015, via Internet Archive: Wayback Machine URL <https://web.archive.org/web/20150214084616/http://genearrays.com/services/microarrays/illumina/beadarray-technology/>, [retrieved on Jan. 30, 2020], 3 pages.
Gnanapragasam, "Unlocking the molecular archive: the emerging use of formalin-fixed paraffin-embedded tissue for biomarker research in urological cancer," BJU International, 2009, 105(2):274-278.
Goldkorn et al., "A simple and efficient enzymatic method for covalent attachment of DNA to cellulose. Application for hybridization-restriction analysis and for in vitro synthesis of DNA probes," Nucleic Acids Res., 1986, 14(22):9171-9191.
Gracia Villacampa et al., "Genome-wide Spatial Expression Profiling in FFPE Tissues," bioRxiv, 2020, pp. 38 pages.
Gunderson et al., "Decoding randomly ordered DNA arrays," Genome Research, 2004, 14(5):870-877.
Guo et al., "Direct fluorescence analysis of genetic polymorphisms by hybridization with oligonucleotide arrays on glass supports," Nucleic Acids Res., Dec. 1994, 22(24):5456-65.
Gupta et al., "Single-cell isoform RNA sequencing characterizes isoforms in thousands of cerebellar cells," Nature Biotechnol., Oct. 2018, 36:1197-1202.
Hamaguchi et al., "Direct reverse transcription-PCR on oligo(dT)-immobilized polypropylene microplates after capturing total mRNA from crude cell lysates," Clin Chem., Nov. 1998, 44(11):2256-63.
Hayes et al., "Electrophoresis of proteins and nucleic acids: I-Theory," BMJ, Sep. 1989, 299(6703):843-6.
He et al., "In situ synthesis of protein arrays," Current Opinion in Biotechnology, 2008, 19(1):4-9.
He, "Cell-free protein synthesis: applications in proteomics and biotechnology," New Biotechnology, 2008, 25(2-3):126-132.
Hejatko et al., "In situ hybridization technique for mRNA detection in whole mount *Arabidopsis* samples," Nature Protocols, 2006, 1(4):1939-1946.

(56) References Cited

OTHER PUBLICATIONS

Hiatt et al., "Parallel, tag-directed assembly of locally derived short sequence reads," Nature Methods, 2010, 7(2):119-25.
Jamur et al., "Permeabilization of cell membranes.," Method Mol. Biol., 2010, 588:63-66.
Jemt et al., "An automated approach to prepare tissue-derived spatially barcoded RNA-sequencing libraries," Scientific Reports, 2016, 6:37137, 10 pages.
Kapteyn et al., "Incorporation of non-natural nucleotides into template-switching oligonucleotides reduces background and improves cDNA synthesis from very small RNA samples," BMC Genomics, Jul. 2010, 11:413, 9 pages.
Korbel et al., "Paired-end mapping reveals extensive structural variation in the human genome," Science, 2007, 318(5849):420-426.
Kozlov et al., "A High-Complexity Multiplexed Solution-Phase Assay for Profiling Protease Activity on Microarrays," Comb. Chem. and High Throughput, 11: 24-35, 2008.
Kozlov et al., "A highly scalable peptide-based assay system for proteomics," PLoS ONE, 2012, 7(6):e37441, 10 pages.
Kretschy et al., "Next-Generation o-Nitrobenzyl Photolabile Groups for Light-Directed Chemistry and Microarray Synthesis," Angewandte Chemie International Edition, Jul. 2015, 54(29):8555-8559.
Kristensen et al., "High-Throughput Methods for Detection of Genetic Variation," BioTechniques, Feb. 2001, 30(2):318-332.
Kurz et al., "cDNA—protein fusions: covalent protein—gene conjugates for the in vitro selection of peptides and proteins," ChemBioChem., 2001, 2(9):666-72.
Kwok, "High-throughput genotyping assay approaches," Pharmocogenomics, Feb. 2000, 1(1):95-100.
Lage et al., "Whole genome analysis of genetic alterations in small DNA samples using hyperbranched strand displacement amplification and array-CGH," Genome Research, 2003, 13(2):294-307.
Lamture et al., "Direct detection of nucleic acid hybridization on the surface of a charge coupled device," Nucleic Acid Res., Jun. 1994, 22(11):2121-5.
Landegren et al., "Reading bits of genetic information: methods for single-nucleotide polymorphism analysis," Genome Res., Aug. 1998, 8(8):769-76.
Langdale et al., "A rapid method of gene detection using DNA bound to Sephacryl," Gene, 1985, 36(3):201-210.
Larsen et al., "Characterization of a recombinantly expressed proteinase K-like enzyme from a psychrotrophic *Serratia* sp," FEBS J., Jan. 2006, 273(1):47-60.
Lee et al., "Fluorescent in situ sequencing (FISSEQ) of RNA for gene expression profiling in intact cells and tissues," Nature Protocols, 2015, 10(3):442-458.
Leriche et al., "Cleavable linkers in chemical biology," Bioorganic & Medicinal Chemistry, 2012, 20:571-582.
Lindstrom et al., "Miniaturization of biological assays—Overview on microwell devices for single-cell analyses," Biochimica et Biophysica Acta, 2011, 1810:308-316.
Linnarsson, "Recent advances in DNA sequencing methods—general principles of sample preparation," Experimental Cell Research, 2010, 316(8):1339-1343.
Liu et al., "High-Spatial-Resolution Multi-Omics Atlas Sequencing of Mouse Embryos via Deterministic Barcoding in Tissue," BioRxiv, 2019, 55 pages.
Lizardi et al., "Mutation detection and single-molecule counting using isothermal rolling-circle amplification," Nat. Genet., 1998, 19(3):225-232.
Lundberg et al., "Multiplexed homogeneous proximity ligation assays for high-throughput protein biomarker research in serological material," Mol Cell Proteomics, 2011, 10(4):M110.004978, 11 pages.
MacBeath et al., "Printing proteins as microarrays for high-throughput function determination," Science, Sep. 2000, 289(5485):1760-1763.
Marx, "Method of the Year: spatially resolved transcriptomics," Nature Methods, 2021, 18(1):9-14.
Merritt et al., "Multiplex digital spatial profiling of proteins and RNA in fixed tissue," Nat Biotechnol, May 2020, 38(5):586-599.
Metzker, "Sequencing technologies—the next generation," Nature Reviews Genetics, 2010, 11(1):31-46.
Miller et al., "Basic concepts of microarrays and potential applications in clinical microbiology," Clinical Microbiology Reviews, 2009, 22(4):611-633.
Mishra et al., "Three-dimensional genome architecture and emerging technologies: looping in disease," Genome Medicine, 2017, 9(1):87, 14 pages.
Mitra et al., "Digital genotyping and haplotyping with polymerase colonies," Proc. Natl. Acad. Sci. USA, May 2003, 100(10):5926-5931.
Mizusawa et al., "A bacteriophage lambda vector for cloning with BamHI and Sau3A," Gene, 1982, 20(3):317-322.
Nawy, "Spatial transcriptomics", Nature Methods, vol. 15, No. 1, 2018.
Nikiforov et al., "The use of 96-well polystyrene plates for DNA hybridization-based assays: an evaluation of different approaches to oligonucleotide immobilization," Anal Biochem, May 1995, 227(1):201-9.
Nowak et al., "Entering the Postgenome Era," Science, 1995, 270(5235):368-71.
Pemov et al., "DNA analysis with multiplex microarray-enhanced PCR," Nucl. Acids Res., Jan. 2005, 33(2):e11, 9 pages.
Perler et al., "Intervening sequences in an Archaea DNA polymerase gen," Proc Natl Acad Sci USA, Jun. 1992, 89(12):5577-5581.
Petterson et al., "Generations of sequencing technologies," Genomics, 2009, 93(2):105-111.
Polsky-Cynkin et al., "Use of DNA immobilized on plastic and agarose supports to detect DNA by sandwich hybridization," Clin. Chem., 1985, 31(9):1438-1443.
Ranki et al., "Sandwich hybridization as a convenient method for the detection of nucleic acids in crude samples," Gene, 1983, 21(1-2):77-85.
Reinartz et al., "Massively parallel signature sequencing (MPSS) as a tool for in-depth quantitative gene expression profiling in all organisms," Brief Funct Genomic Proteomic, Feb. 2002, 1(1):95-104.
Ristova et al., "Study of hydrogenated amorphous silicon thin films as a potential sensor for He—Ne laser light detection," Applied Surface Science, Sep. 2003, 218(1-4):44-53.
Rodriques et al., "Slide-seq: A scalable technology for measuring genome-wide expression at high spatial resolution," Science, 2019, 363(6434):1463-1467.
Ronaghi et al., "A sequencing method based on real-time pyrophosphate," Science, Jul. 1998, 281(5375):363-365.
Ronaghi et al., "Real-time DNA sequencing using detection of pyrophosphate release," Analytical Biochemistry, Nov. 1996, 242(1):84-89.
Ronaghi, "Pyrosequencing sheds light on DNA sequencing," Genome Res, Jan. 2001, 11(1):3-11.
Salmén et al., "Barcoded solid-phase RNA capture for Spatial Transcriptomics profiling in mammalian tissue sections," Nature Protocols, Oct. 2018, 13(11):2501-2534.
Saxonov et al., "10x Genomics, Mastering Biology to Advance Human Health," PowerPoint, 10x, 2020, 41 pages.
Schena et al., "Quantitative monitoring of gene expression patterns with a complementary DNA microarray," Science, Oct. 1995, 270(5235):467-470.
Shalon et al., "A DNA microarray system for analyzing complex DNA samples using two-color fluorescent probe hybridization," Genome Res., Jul. 1996, 6(7):639-45.
Stahl et al., "Visualization and analysis of gene expression in tissue sections by spatial transcriptomics," Science, Jul. 2016, 353(6294):78-82.
Stahl et al., "Visualization and analysis of gene expression in tissue sections by spatial transcriptomics," Supplementary Materials, Science, Jul. 2016, 353(6294):78-82, 41 pages.
Stimpson et al., "Real-time detection of DNA hybridization and melting on oligonucleotide arrays by using optical wave guides," Proc Natl Acad Sci USA, Jul. 1995, 92(14):6379-83.

(56) References Cited

OTHER PUBLICATIONS

Strell et al., "Placing RNA in context and space—methods for spatially resolved transcriptomics," The FEBS Journal, 2019, 286(8):1468-1481.

Tijssen et al., "Overview of principles of hybridization and the strategy of nucleic acid assays" in Techniques in Biochemistry and Molecular Biology—Hybridization with Nucleic Acid Probes, 1993, 24(Chapter 2), 65 pages.

Trejo et al., "Extraction-free whole transcriptome gene expression analysis of FFPE sections and histology-directed subareas of tissue," PLoS ONE, Feb. 2019, 14(2):e0212031, 22 pages.

Twyman et al., "Techniques Patents for SNP Genotyping," Pharmacogenomics, Jan. 2003, 4(1):67-79.

Valley et al., "Optoelectronic tweezers as a tool for parallel single-cell manipulation and stimulation," IEEE Trans Biomed Circuits Syst., Dec. 2009, 3(6):424-31.

Van Gelder et al., "Amplified RNA synthesized from limited quantities of heterogeneous cDNA," Proc. Natl. Acad. Sci. USA, 1990, 87(5):1663-1667.

Vasiliskov et al., "Fabrication of microarray of gel-immobilized compounds on a chip by copolymerization," Biotechniques, Sep. 1999, 27(3):592-606.

Vickovic et al., "High-definition spatial transcriptomics for in situ tissue profiling," Nat Methods, Oct. 2019, 16(10):987-990.

Vogelstein et al., "Digital PCR," Proceedings of the National Academy of Sciences, Aug. 1999, 96(16):9236-9241.

Walker et al., "Strand displacement amplification—an isothermal, in vitro DNA amplification technique," Nucleic Acids Research, 1992, 20(7):1691-1696.

Wang et al., "Imaging-based pooled CRISPR screening reveals regulators of lncRNA localization," Proc Natl Acad Sci USA, May 2019, 116(22):10842-10851.

Wang et al., "High-fidelity mRNA amplification for gene profiling," Nature Biotechnology, Apr. 2000, 18(4):457-459.

Worthington et al., "Cloning of random oligonucleotides to create single-insert plasmid libraries," Anal Biochem, 2001, 294(2):169-175.

Yershov et al., "DNA analysis and diagnostics on oligonucleotide microchips," Proc. Natl. Acad. Sci. USA, May 1996, 93(10):4913-4918.

Zhu et al., "Reverse transcriptase template switching: a SMART approach for full-length cDNA library construction," Biotechniques, Apr. 2001, 30(4):892-897.

* cited by examiner

ELECTROPHORETIC METHODS FOR SPATIAL ANALYSIS

CROSS-REFERENCE TO RELATED APPLICATIONS

This application claims the benefit of U.S. Patent Application Ser. No. 62/985,103 titled ELECTROPHORETIC METHODS FOR SPATIAL ANALYSIS, filed Mar. 4, 2020, the disclosure of which is hereby incorporated by reference in its entirety.

BACKGROUND

Cells within a tissue have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, e.g., the cell's morphology, differentiation, fate, viability, proliferation, behavior, signaling, and cross-talk with other cells in the tissue.

Spatial heterogeneity has been previously studied using techniques that typically provide data for a handful of analytes in the context of intact tissue or a portion of a tissue (e.g., tissue section), or provide significant analyte data from individual, single cells, but fails to provide information regarding the position of the single cells from the originating biological sample (e.g., tissue).

Various methods have been used to prepare a biological sample for analyzing analyte data in the sample. In some applications, analytes can be captured from a biological sample, and a high resolution of the captured analytes is needed for accurate analysis.

SUMMARY

The present disclosure provides electrophoretic apparatuses, systems, kits, and methods for preparing a biological sample for spatial analysis.

The spatial resolution of analytes (e.g., nucleic acids or proteins from a biological sample) may be limited due to constraints when patterning capture areas on an array designed to capture the analytes from a biological sample. The electrophoretic techniques described herein can be useful in overcoming spatial resolution limitations in a capture array system.

For example, disclosed techniques can utilize divergent or convergent electric fields, as opposed to parallel electric fields, as the basis for an electrophoretic capture array platform to enhance or improve spatial resolution of analytes. Such divergent or convergent electric fields, can be generated by different sizes of electrodes that are associated with the capture array substrates and/or the sample substrates. By way of example, a source electrode can be associated, attached to, or embedded in a sample substrate comprising a biological sample and a target electrode can be associated with a capture substrate comprising a capture probe. Alternatively, the sample substrate and the capture substrate can be made to be conductive respectively so that they can be used as anode and cathode in an electrophoretic device or system. In some instances, the source electrode can provide an effective conductive area different from the target electrode. An electric field can be generated between the source electrode and the target electrode. The ratio of the sizes of the source electrode and the target electrode can determine a degree of magnification or demagnification of the spatial resolution of analytes being captured. In some instances, the distance between the source electrode and the target electrode can be adjusted thereby allowing for the resolution to be fine tuned via magnification or demagnification. In some implementations, the distance between the electrodes can be adjusted to reduce or suppress lateral diffusion of analytes. The analytes can expand or spread out during migration from the sample substrate toward the capture substrate through the divergent electric field. The analytes captured on the capture substrate are considered to be magnified, compared to the analytes originally included in the sample on the sample substrate. The analytes contract or are concentrated while migrating from the sample substrate toward the capture substrate through the convergent electric field. The analytes captured on the capture substrate are considered to be demagnified, compared to the analytes originally included in the sample on the sample substrate.

The techniques described herein can allow for the selection of a region of interest (ROI) in a sample so that analytes in the ROI are captured via magnification or demagnification. Some implementations include an array of patterned electrodes attached to or imbedded in the source substrate (e.g., the substrate upon which a sample is located). A subset of the electrodes in the array can be selected to correspond to a ROI in the sample and actuated to generate an electric field between the selected subset of electrodes of the source substrate (e.g., comprising a biological sample) and the target substrate (e.g., the capture substrate), so that the analytes in the ROI can be captured via magnification or demagnification.

Other implementations include a light-actuated conductive film (e.g., amorphous silicon) located on the source substrate. For example, light can be illuminated onto the ROI area of the source substrate comprising a light actuated conductive film thereby generating an electrophoretic circuit between the illuminated region on the source substrate and the target substrate thereby driving analytes in the ROI from the source substrate to the target substrate where they can be captured via magnification or demagnification.

In addition, the techniques described herein provide a solution to facilitate a targeted analyte capture. For example, some implementations include a mechanism for coupling a photo-thermal effect (e.g., infrared light illumination) to thermally activate permeabilizing enzymes found in the same region as the ROI region. This can allow for the separate or sequential capture of analytes in a number of ROIs without permeabilizing the entire sample on the source substrate.

Particular embodiments described herein include an electrophoretic system for analyte migration. Such analyte migration can be used for spatial analysis of analytes in a biological sample. In some embodiments, the electrophoretic system includes a first substrate, a second substrate, a buffer chamber, and a controller. The first substrate may include a first substrate region including a biological sample. The first substrate region may be electrically conductive and have a first surface area. The second substrate may include a second substrate region for receiving analytes from the biological sample. The second substrate region may be electrically conductive and have a second surface area. The buffer chamber includes a buffer between the first substrate region and the second substrate region. The controller can generate an electric field between the first substrate region and the second substrate region such that the analytes are induced to migrate from the first substrate region (e.g., with a biological sample) toward the second substrate region (e.g., substrate for receiving analytes). The first surface area of the first substrate region may be larger or smaller than the second surface area of the second substrate region In some embodiments, first and second substrate functionalities can be reversed, such that the first substrate could receive analytes while the second substrate comprises a biological sample. In such an embodiment, an electric field is generated such that analytes are induced to migrate from the biological sample on the second substrate toward the first substrate where they are received or captured.

In some implementations, the system can optionally include one or more of the following features. The second substrate region may include capture probes for capturing the migrated analytes. In some embodiments, a ratio of the first surface area and the second surface area may range from 0.1 to 100. The first substrate region may include an array of patterned conductive regions that are selectively actuated to generate an electric field between the actuated conductive regions and the second substrate region. The first surface area of the first substrate region may be smaller than the second surface area of the second substrate region such that a generated electric field is a divergent electric field resulting in the analytes on the first substrate region being magnified on the second substrate region when captured. The first surface area of the first substrate region may be larger than the second surface area of the second substrate region such that a generated electric field is a convergent electric field resulting in the analytes on the first substrate region being demagnified on the second substrate region when captured. In some embodiments, the first substrate region is a cathode and the second substrate region is an anode.

The first substrate may be arranged in parallel with the second substrate. The first substrate may be spaced apart at a gap or distance from the second substrate. The gap or distance may be selected to maintain a diffusion rate, that is lower than a threshold diffusion rate, of the analytes migrating under an electric field. The gap or distance between a first and a second substrate may range from 1 um to 10 mm. The first substrate region and the second substrate region may have the shape of concentric circular disks, which is shaped to be circular in two dimensions. The first substrate region and the second substrate region may be shaped to be concentrically spherical in three dimensions. The first substrate and the second substrate may be glass slides and each glass slide, or regions thereof, may be coated with a conductive material. The conductive material may include at least one of tin oxide (TO), indium tin oxide (ITO), a transparent conductive oxide (TCO), aluminum doped zinc oxide (AZO), or fluorine doped tin oxide (FTO). The buffer may include a permeabilization reagent. The electrophoretic system may further include a light configured to illuminate onto at least a portion of the first substrate region to permeabilize the biological sample on the at least a portion of the first substrate region. In addition or alternatively, the sample may be permeabilized using a detergent before or after enzymatic treatment. In addition or alternatively, the sample may be incubated with a permeabilizing agent to facilitate permeabilization of the sample. In addition or alternatively, the sample may be permeabilized with a lysis reagent being added to the sample. In addition or alternatively, the sample may be permeabilized by exposing the sample to a protease capable of degrading histone proteins. The electrophoretic system may further include a power supply and electrical wires connecting the power supply to the first substrate and the second substrate, or regions thereof.

Particular embodiments described herein include a method for capturing analytes from a biological sample. The method may include placing the biological sample on a first substrate region of a first substrate, the biological sample including analytes; placing capture probes on a second substrate region of a second substrate, the second substrate region having a second surface area different from a first surface area of the first substrate region; providing a buffer between the first substrate region and the second substrate region; and generating an electric field between the first substrate region and the second substrate region to cause the analytes in the biological sample to migrate from the first substrate region toward the capture probes on the second substrate region.

In some implementations, the system can optionally include one or more of the following features. The first substrate region may include an array of patterned conductive regions. The method may include identifying a region of interest (ROI) in the biological sample, and actuating one or more of the patterned conductive regions on the first substrate to generate the electric field, the one or more of the patterned conductive regions corresponding to the ROI. The first surface area of the first substrate region may be smaller than the second surface area of the second substrate region such that the electric field is configured to be a divergent electric field, and the analytes from the ROI in the biological sample are magnified upon capture on the second substrate region. The first surface area of the first substrate region may be larger than the second surface area of the second substrate region such that the electric field is configured to be a convergent electric field, and the analytes from the ROI in the biological sample are demagnified upon capture on the second substrate region. The first substrate may be spaced apart at a distance from the second substrate. The distance may be selected to maintain a diffusion rate of the analytes migrating under the electric field. The diffusion rate is lower than a predetermined value.

Particular embodiments described herein include an electrophoretic system for capturing an analyte from a biological sample. The system may include a first substrate, a second substrate, a buffer chamber, a light generator, and a controller. The first substrate may include a first substrate region configured to place a biological sample including analytes. The biological sample may contain analytes. The first substrate region may include a photoconductive material. The second substrate may include a second substrate region configured to place capture probes thereon. The second substrate region may be configured to be conductive. The buffer chamber includes a buffer between the first substrate region and the second substrate region. The light generator may be configured to emit first light onto a least a portion of the first substrate region to permit for the at least a portion of the first substrate region to be electrically conductive. The controller may be configured to, based on the first light being emitted onto the at least a portion of the first substrate region, generate an electric field between the at least a portion of the first substrate region and the second substrate region such that the analytes in the biological sample migrate from the at least a portion of the first substrate region toward the capture probes on the second substrate region. The surface area of the at least a portion of the first substrate region may be different from a surface area of the second substrate region.

In some implementations, the system can optionally include one or more of the following features. The surface area of the at least a portion of the first substrate region may be smaller than the surface area of the second substrate region such that the electric field is configured to be a divergent electric field, and the analytes in the biological sample are magnified when captured on the second substrate region. The surface area of the at least a portion of the first substrate region is larger than the surface area of the second substrate region such that the electric field may be configured to be a convergent electric field, and the analytes in the biological sample are demagnified when captured on the second substrate region. The first substrate is a glass slide upon which is the photoconductive material including amorphous silicon. The second substrate may be a glass slide coated with a conductive material. The conductive material may include at least one of tin oxide (TO), indium tin oxide (ITO), a transparent conductive oxide (TCO), aluminum doped zinc oxide (AZO), or fluorine doped tin oxide (FTO). The first light may include at least one of an ultraviolet (UV) light, visible light, or infrared light. The electrophoretic system may include a second light configured to illuminate onto the at least a portion of the first substrate region to permeabilize the biological sample on the at least a portion of the first substrate region. The second light may be infrared light. The first substrate region may be configured to be a cathode, and the second substrate region may be configured to be an anode. The first substrate may be arranged in parallel with the second substrate. The first substrate may be arranged at an angle to the second substrate. The first substrate may be spaced apart at a distance from the second substrate. The distance may be selected to maintain a diffusion rate of the analytes migrating under the electric field to be lower than a predetermined value. The distance may range from 1 um to 10 cm. The first substrate region and the second substrate region may be shaped to be concentric circular disks. The first substrate region and the second substrate region may be shaped to be concentrically spherical. The buffer may include a permeabilization reagent. The electrophoretic system may further include a light configured to illuminate onto at least a portion of the first substrate region to permeabilize the biological sample on the at least a portion of the first substrate region. In addition or alternatively, the sample may be permeabilized using a detergent before or after enzymatic treatment. In addition or alternatively, the sample may be incubated with a permeabilizing agent to facilitate permeabilization of the sample. In addition or alternatively, the sample may be permeabilized with a lysis reagent being added to the sample. In addition or alternatively, the sample may be permeabilized by exposing the sample to a protease capable of degrading histone proteins. The electrophoretic system may include a power supply, and electrical wires connecting the power supply to the first substrate region and the second substrate region.

Particular embodiments described herein include a method for migrating analytes. The method may include placing a biological sample on a first substrate region of a first substrate, the biological sample including analytes, and the first substrate region including a photoconductive material; placing capture probes on a second substrate region of a second substrate; providing a buffer between the first substrate region and the second substrate region; emitting first light onto at least a portion of the first substrate region of the first substrate to permit for the at least a portion of the first substrate region to be electrically conductive; and generating an electric field between the at least a portion of the first substrate region and the second substrate region to cause the analytes in the biological sample to migrate from the at least a portion of the first substrate region toward the capture probes on the second substrate region. A surface area of the at least a portion of the first substrate region may be different from a surface area of the second substrate region.

In some implementations, the system can optionally include one or more of the following features. The method may further include identifying a region of interest (ROI) in the biological sample. The ROI may include the at least a portion of the first substrate region of the first substrate. The method may further include emitting second light onto the at least a portion of the first substrate region to permeabilize the biological sample on the at least a portion of the first substrate region.

All publications, patents, and patent applications mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated.

The term "each," when used in reference to a collection of items, is intended to identify an individual item in the collection but does not necessarily refer to every item in the collection, unless expressly stated otherwise, or unless the context of the usage clearly indicates otherwise.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternatives to the specific embodiments described herein are also within the scope of this disclosure.

DESCRIPTION OF DRAWINGS

The following drawings illustrate certain embodiments of the features and advantages of this disclosure. These embodiments are not intended to limit the scope of the appended claims in any manner. Like reference symbols in the drawings indicate like elements.

DETAILED DESCRIPTION

Figure 1:
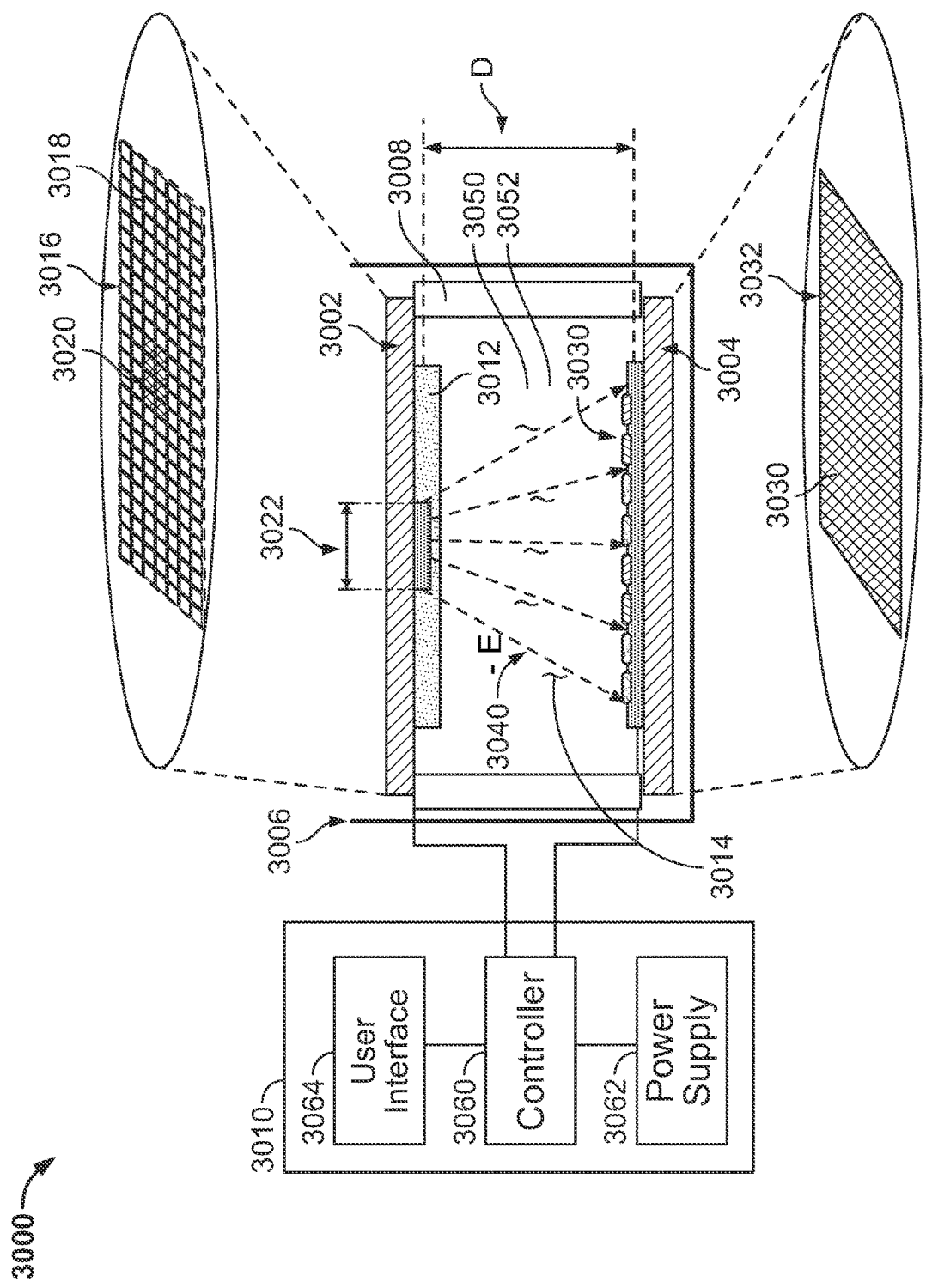
FIG. 1 schematically illustrates an example electrophoretic system for preparing a sample.

In general, the techniques described herein relate to electrophoretic compositions, systems and methods for migrating analytes that may be present in a biological sample from one substrate to another. The techniques described herein can serve to magnify or demagnify spatial resolution of analytes of interest that are captured using an electrophoretic system.

Some implementations use a diverging or converging electric field in an electrophoretic capture system. Such a divergent or convergent electric field, as opposed to a parallel electric field, can be generated by utilizing different sizes of electrodes associated with or imbedded in substrates. Alternatively, a divergent or convergent electric field can also be generated by utilizing different sizes of conductive materials which may be found on substrates. Alternatively, a divergent or convergent electric field can be generated by utilizing different types of conductive materials found on substrates. In some implementations, a source electrode could be a sample substrate upon which is located a biological sample which may comprise analytes of interest, and a target electrode could be a capture substrate wherein capture probes are affixed (e.g., directly or indirectly, and reversibly or non-reversibly). The sample substrate and the capture substrate could be conductive for use as an anode and a cathode in electrophoresis. The source electrode is configured to provide an effective conductive area different from the target electrode. An electric field can be generated between the source electrode and the target electrode. The ratio of the sizes of the source electrode and the target electrode can determine a degree of magnification or demagnification of the spatial resolution of analytes being captured. Further, the distance between the source electrode and the target electrode can be adjusted thereby augmenting the degree of magnification or demagnification of the resolution. In some implementations, the distance between the electrodes can be adjusted to reduce or suppress lateral diffusion of analytes. The analytes can expand or spread out during migration from the sample substrate toward the capture substrate through the divergent electric field. The analytes captured on the capture substrate are considered to be magnified, compared to the analytes originally included in the sample on the sample substrate. The analytes contract or are concentrated while migrating from the sample substrate toward the capture substrate through the convergent electric field. The analytes captured on the capture substrate are considered to be demagnified, compared to the analytes originally included in the sample on the sample substrate The techniques described herein allows for selecting a region of interest (ROI) in a biological sample so that the analytes in the ROI can be captured and either magnified or demagnified. Some implementations include an array of patterned electrodes from the source substrate (e.g., the substrate upon which a biological sample is located). A subset of electrodes in the source substrate can be selected that correspond to a ROI in the biological sample, and actuated to generate an electric field between the selected subset of electrodes of the source substrate and the target substrate (e.g., the capture substrate), so that the analytes in the ROI can migrate to the target substrate and be captured via magnification or demagnification as described above. For example, the selected subset of electrodes may be actuated by applying a voltage across the selected subset of electrodes to generate the electric field.

Other embodiments include a light-actuated conductive film (e.g., amorphous silicon) that can be located on the source substrate. In such an embodiment, if a light-actuated conductive film is on the source substrate, a light can be used to illuminate an ROI on the source substrate thereby generating an electrophoretic circuit between the illuminated region on the source substrate and the target substrate so that the analytes in the ROI can migrate and be captured on the target substrate. In some implementations, amorphous silicon compound can be coated on the substrate using, for example, plasma enhanced chemical vapor deposition. The photoconductive light can be on the UV and visible spectrum. Examples of amorphous silicon coating are described further in M. Ristova, et al., *Study of hydrogenated amorphous silicon thin films as a potential sensor for He—Ne laser light detection*, Applied Surface Science, vol. 218, Issues 1-4, 30 Sep. 2003, Pages 44-53, the disclosure of which is incorporated herein by reference in its entirety.

In addition, the techniques described herein provide a solution to facilitate a target analyte capture. For example, some implementations include a mechanism for coupling a photo-thermal effect (e.g., infrared light illumination) to thermally activate permeabilizing enzymes locally around the ROI region. This can allow for separately or sequentially capturing analytes in a number of ROIs without permeabilizing the entire sample on the source substrate. For example, water in a liquid permeabilization reagent (e.g., a buffer comprising a permeabilization agent such as a protease, e.g.,) can strongly absorb infrared light and be heated up, which is a photothermal effect. Heating can promote the enzyme activity. For example, protease enzymes (e.g., proteinase K (PROK) enzymes) can become more active at a higher temperature. In particular embodiments, the liquid permeabilization agent (e.g., the buffer comprising a permeabilization agent such as a protease, e.g., PROK) is kept at a cold temperature (e.g., around 4° C.) to suppress activity of the permeabilization agent. Local heating via, e.g., targeted infrared illumination of an ROI can locally activate the permeabilization agent such as a protease, e.g., PROK, allowing for local release of analyte from the ROI for subsequent capture. For example, the targeted infrared illumination can elevate the temperature to, e.g., 20° C.-70° C., thereby locally activating the permeabilization agent, e.g., protease such as PROK. More examples are described in Larsen, et al., *Characterization of a recombinantly expressed proteinase K-like enzyme from a psychrotrophic Serratia sp.*, FEBS Journal, vol. 273, Issue 1, January 2006, pages 47-60 (also available at https://febs.onlinelibrary.wiley.com/doi/full/10.1111/j.1742-4658.2005.05044.x), the disclosure of which is incorporated herein by reference in its entirety.

Figure 2B:
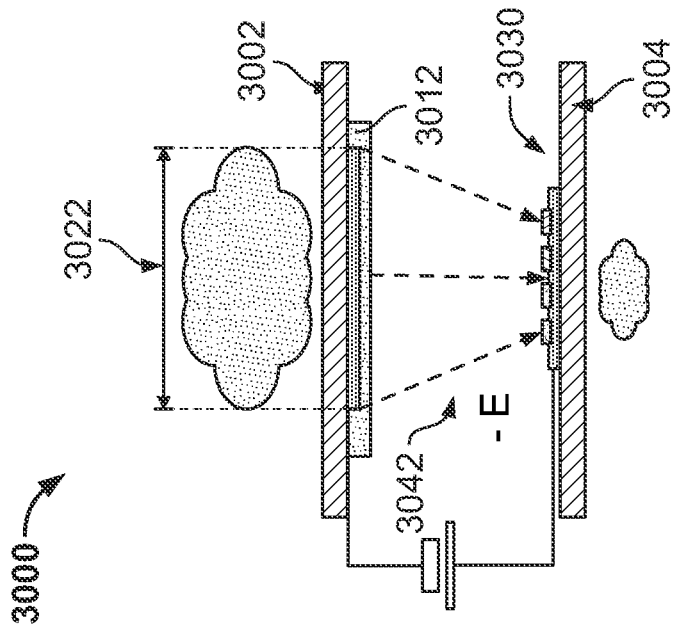
FIGS. 2A-B illustrate example magnification and demagnification techniques in the electrophoretic system of FIG. 1.
Figure 2A:
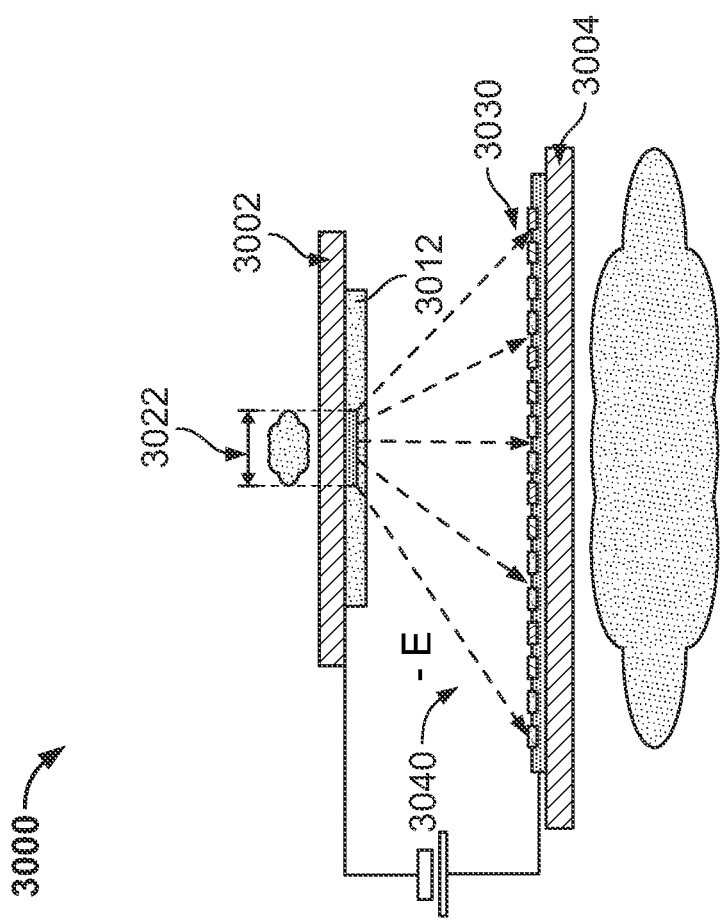

Referring to FIGS. 1 and 2A-B, an example electrophoretic system 3000 is described. FIG. 1 schematically illustrates an example configuration of the electrophoretic system 3000. In some implementations, the electrophoretic system 3000 can be used to actively cause analytes 3014 (e.g., nucleic acids, proteins, charged molecules, etc.) in a biological sample 3012 on a source substrate 3002 to migrate to capture probes 3030 on a target substrate 3004. The electrophoretic system 3000 can improve the spatial resolution of captured analytes by actively directing analytes to diverge FIG. 2A or converge FIG. 25B toward the target substrate so that the analytes are captured on the target substrate in an expanded (e.g., magnified) or condensed (e.g., demagnified) manner. The electrophoretic system 3000 further includes an electrophoretic container 3006, a spacer 3008 between the two substrates, and a control system 3010.

Referring further to FIG. 1, the first substrate 3002 is configured to receive a biological sample 3012 that contains one or more analytes 3014. By way of example, the biological sample can be one or more cells or a tissue sample including one or more cells. The first substrate 3002 can include a first substrate 3016. In some implementations, the first substrate 3016 can include a patterned array of multiple regions, for example an array of conductive regions 3018. The biological sample 3012 can be prepared on the first substrate 3002 in various ways described herein.

The first substrate 3002 can be configured as a first electrode in the electrophoretic system 3000. For example, the first substrate 3002 can be used as a cathode. In another example, the first substrate 3002 can be used as an anode.

The first substrate 3002 can be conductive at least in the first substrate region 3016. In some implementations, the first substrate 3002 can be configured as a conductive substrate described herein. For example, the first substrate 3002 can include one or more conductive materials that permit for the first substrate 3002 to function as an electrode. Examples of such a conductive material include, but are not limited to, tin oxide (TO), indium tin oxide (ITO), a transparent conductive oxide (TCO), aluminum doped zinc oxide (AZO), fluorine doped tin oxide (FTO), and any combination thereof. Alternatively or in addition, other materials may be used to provide desired conductivity to the first substrate 3002. The first substrate 3002 can be coated with the conductive material. For example, the first substrate 3002 can include a conductive coating on the surface thereof, and the sample 3012 is provided on the coating of the substrate 3002. By way of example, the first substrate can include a glass slide coated with a conductive material.

In some embodiments, the first substrate 3002 includes an array of conductive regions 3018. The array of conductive regions 3018 can be disposed within the first substrate region 3016. Alternatively, the array of conductive regions 3018 can be disposed at least partially outside the first substrate region 3016. The conductive regions 3018 can be patterned in various configurations. In the illustrated example, the conductive regions 3018 are configured in a square pattern.

The conductive regions 3018 can be selectively activated to adjust the size of the first electrode 3020 in the electrophoretic system 3000. For example, a subset of conductive regions 3018 can be selected to correspond to a region of interest (ROI) 3022 on the sample 3012, and electrically activated to generate an electric field between the subset of conductive regions 3018 and the second substrate 3004. For example, the control system 3010 can be used to receive an input of selecting the subset of conductive regions 3018 that corresponds to the ROI 3022. In some implementations, the control system 3010 includes a user interface 3064 to receive a user input of the selection. In other implementations, the control system 3010 can automatically select the ROI 3022 or the subset of conductive regions 3018 corresponding to the ROI 3022. Further, the control system 3010 can be used to electrically activate the selected subset of conductive regions 3018 by, for example, applying a voltage across the selected subset of conductive regions 3018, thereby generating an electric field therebetween. In some implementations, the user interface 3064 can receive an input of selecting a voltage and other parameters to generate the electric field across the selected subset of conductive regions 3018.

Although the first substrate 3002 is illustrated to include a single substrate region 3016 in FIG. 1, other implementations of the first substrate 3002 can include a plurality of substrate regions configured to place multiple samples thereon, respectively. Each of such multiple substrate regions can be configured similarly to the first substrate region 3016 described herein.

Referring still to FIG. 1, the second substrate 3004 comprises capture probes 3030. In some implementations, the second substrate 3004 incudes a second substrate region 3032. The second substrate 3004 can be configured as a second electrode in the electrophoretic system 3000. For example, the second substrate 3004 can be used as an anode. In another example, the second substrate 3004 can be used as a cathode. The capture probes 3030 can be placed on the second substrate region 3032 in a variety of ways described herein. For example, capture probes 3030 can be directly attached (e.g., reversibly or non-reversibly) to a feature on an array. In another embodiment, capture probes 3030 can be indirectly attached (e.g., reversibly or non-reversibly) to a feature on an array. Alternatively or in addition, the capture probes 3030 can be immobilized on the second substrate region 3032 of the second substrate 3004. Embodiments of the capture probes 3030 are further described herein, for example with reference to FIG. 8.

The second substrate 3004 can be conductive in the second substrate region 3032. In some implementations, the second substrate 3004 can be configured as a conductive substrate described herein. For example, the second substrate 3004 can include one or more conductive materials that permit for the second substrate 3004 to function as an electrode. Examples of such a conductive material include, but are not limited to, tin oxide (TO), indium tin oxide (ITO), a transparent conductive oxide (TCO), aluminum doped zinc oxide (AZO), fluorine doped tin oxide (FTO), and any combination thereof. Alternatively or in addition, other materials may be used to provide desired conductivity to the second substrate 3004. In some implementations, the second substrate 3004 can be coated with the conductive material. For example, the second substrate 3004 can include a conductive coating on the surface thereof, and the capture probes 3030 are provided on the coating of the second substrate 3004. The second substrate can include a glass slide coated with a conductive material.

In some implementations, the second substrate 3004 can include an array of conductive regions that are selectively actuated, similarly to the conductive regions 3018 of the first substrate 3002. In some implementations, the second substrate 3004 can have a customized electrode pattern to improve capture uniformity.

In some implementations, the first substrate 3002 (or the first substrate region 3016 thereof) and the second substrate 3004 (or the second substrate region 3032 thereof) can be flat and arranged in parallel with each other. For example, the first conductive surface area of the first substrate 3002 and the second conductive surface area of the second substrate 3004 can be flat and arranged in parallel with each other. Alternatively, at least one of the first substrate 3002 (or the first substrate region 3016 thereof, or the first conductive surface area thereof) and the second substrate 3004 (or the second substrate region 3032 thereof, or the second conductive surface area thereof) can be not flat (e.g., curved or having variations in height or depth). In addition or alternatively, the first substrate 3002 (or the first substrate region 3016 thereof, or the first conductive surface area thereof) can be arranged to be angled with the second substrate 3004 (or the second substrate region 3032 thereof, or the second conductive surface area thereof). For example, in some embodiments the first substrate and the second substrate can be at a 90° angle one to the other.

In some implementations, the first substrate 3002 (or the first substrate region 3016 thereof, or the first conductive surface area thereof) and the second substrate 3004 (or the second substrate region 3032 thereof, or the second conductive surface area thereof) can be shaped as concentric circular or spherical disks. Other configurations and arrangements are also possible, such as square or rectangular shapes that are arranged concentrically or non-concentrically.

Referring to FIG. 1, the first substrate 3002 and the second substrate 3004 can be arranged within the electrophoretic container 3006. The electrophoretic container 3006 can include a buffer chamber 3050 between the first substrate 3002 and the second substrate 3004. The buffer chamber 3050 is configured to contain a buffer 3052. In some implementations, the first substrate 3002 and the second substrate 3004 can be fully immersed in the buffer 3052. In alternative implementations, either or both of the substrates 3002, 3004 can be partially immersed in the buffer 3052 contained in the electrophoretic container 3006.

The buffer 3052 can be of various types. In some implementations, the buffer 3052 includes a permeabilization reagent. In some embodiments, the buffer 3052 is contained in the buffer chamber 3050 throughout the electrophoretic process. The permeabilization reagent can permeabilize the sample before and/or during electrophoresis. In some implementations, this chemical permeabilization can be performed in conjunction with light permeabilization such as those described herein, for example with reference to FIG. 5. In addition or alternatively, the sample can be permeabilized using other methods described herein, independently or in conjunction with permeabilization using the permeabilization reagent and/or the illumination on the sample.

In some implementations, the buffer can include medium includes at least one of: a solution including a permeabilization reagent, a solid permeabilization reagent, and a hydrogel compound including a permeabilization reagent. In some embodiments, the solution including the permeabilization agent includes greater than about 2 w/v % sodium dodecyl sulfate (SDS). In some embodiments, the solution including the permeabilization agent includes about 8 w/v % to about 12 w/v % SDS. In some embodiments, the solution including the permeabilization agent includes proteinase K. In some embodiments, the solution including the permeabilization agent includes greater than 2 w/v % N-lauroylsarcosine or a sodium salt thereof. In some embodiments, the first member includes an aperture positioned so that when the first substrate is retained, the aperture is aligned with a sample region of the first substrate. In some embodiments, the second member includes at least one aperture positioned so that when the first substrate is retained and the first and second members are aligned by the alignment mechanism, anaperture of the at least one aperature is aligned with at least a portion of a sample region of the first substrate.

In some embodiments, the permeabilization reagent comprises a protease. In some embodiments, the protease is selected from trypsin, pepsin, elastase, or proteinase K.

The biological sample can be permeabilized using permeabilization reagents and techniques known in the art or otherwise described herein. Biological samples from different sources (e.g., brain, liver, ovaries, kidney, breast, colon, etc.) can require different permeabilization treatments. For example, permeabilizing the biological sample (e.g., using a protease) can facilitate the migration of analytes to the substrate surface (e.g., spatially-barcoded features). In some embodiments, the permeabilization reagents can be a detergent (e.g., saponin, Triton X100™, Tween-20™). In some embodiments, an organic solvent (e.g., methanol, acetone) can permeabilize cells of the biological sample. In some embodiments, an enzyme (e.g., trypsin) can permeabilize the biological sample. In another embodiment, an enzyme (e.g., collagenase) can permeabilize the biological sample.

In some embodiments the solution can permeabilize the biological sample and rehydrate the features (e.g., beads) of the shrunken array (e.g., shrunken hydrogel). In some embodiments, the rehydrating solution can stain the biological sample and rehydrate the features of the shrunken array (e.g., beads).

In some embodiments, the rehydrating solution (e.g., permeabilization or stain solution) can diffuse through the biological sample. In some embodiments, the rehydrating solution can reduce diffusion of analytes away from the substrate. In some embodiments, while diffusing through the biological sample, the rehydrating solution can migrate analytes toward the substrate surface and improve the efficiency of analyte capture.

Example structures and processes of using permeabilization reagents are further described in PCT Application No. PCT/US19/65100, titled Imaging System Hardware, filed Dec. 6, 2019, the disclosure of which is incorporated herein by reference in its entirety.

In some embodiments, a spacer 3008 can be disposed between the first substrate 3002 and the second substrate 3004 to separate the first substrate and the second substrate by a distance D. In some embodiments, the spacer 3008 comprises a non-conductive material, such as plastic, glass, porcelain, rubber, silicone, etc. The distance D can be determined to provide a desired level of spatial resolution based on several factors, such as, but not limited to, the strength and/or duration of an electric field generated between the first substrate 3002 and the second substrate 3004, and other parameters described herein.

The control system 3010 can generate an electric field (-E) between the first substrate 3002 and the second substrate 3004. The control system 3010 can include a controller 3060 configured to apply a voltage between the first substrate 3002 and the second substrate 3004 using a power supply 3062. The power supply 3062 can include a high voltage power supply. The controller 3060 can be electrically connected to the first substrate 3002 and the second substrate 3004, for example using electrical wires. The control system 3010 can include a user interface 3064 configured to receive a user input of starting or stopping the electrophoretic process. The user interface 3064 can include various types of input devices, such as a graphic user interface, physical or virtual buttons, switches, keypads, keyboard, etc., configured to receive a user input for adjusting operating parameters of the system 3000 or for accessing other information (e.g., instructions) associated with the system 3000. Examples of operating parameters can include, but are not limited to, voltage applied, duration of voltage application, etc. In some implementations, the input devices can be used to select a subset of conductive regions 3018 that corresponds to a region of interest (ROI) 3022 on the sample 3012 so that the subset of conductive regions are electrically activated to generate an electric field between the subset of conductive regions 3018 and the second substrate 3004. In addition, the user interface 3064 can include an output device, such as a display, lamps, etc., configured to output the operating parameters of the system 3000 or other information associated with the system 3000.

Referring still to FIG. 1, in some implementations, the first substrate 3002 has a first conductive surface area that can be used as the first electrode in the electrophoretic system 3000, and a second substrate 3004 has a second conductive surface area that can be used as the second electrode in the electrophoretic system 3000. In implementations, where the entire first substrate region 3016 is configured and used for the first electrode, the surface area of the first substrate region 3016 can be the first conductive surface area. Similarly, where the entire second substrate region 3032 is configured and used for the second electrode, the surface area of the second substrate region 3032 can be the second conductive surface area. Alternatively, where a portion of the first substrate region 3016 is configured and used for the first electrode, the surface area of the portion of the first substrate region 3016 can be the first conductive surface area. For example, where the first substrate region 3016 includes the array of conductive regions 3018, the subset of conductive regions 3018 that is activated can be the first conductive surface area. Similarly, where a portion of the second substrate region 3032 is configured and used for the second electrode, the surface area of the portion of the second substrate region 3032 can be the second conductive surface area.

In some implementations, the first conductive surface area of the first substrate 3002 is different from the second conductive surface area of the second substrate 3004, so that a divergent or convergent electric field is generated between the first and second conductive surface areas in the electrophoretic system 3000.

As illustrated in FIGS. 26 and 27A, a divergent electric field 3040 can be generated when the first conductive surface area of the first substrate 3002 is smaller than the second conductive surface area of the second substrate 3004. In the divergent electric field 3040, the analytes 3014 can migrate from the sample 3012 on the first substrate 3002 toward the second substrate 3004 in a diverging manner. For example, the analytes 3014 expand or spread out during migration through the divergent electric field 3040 prior to being captured on the second substrate 3004. In this case, the analytes 3014 captured on the second substrate 3004 are considered to be magnified, compared to the analytes originally included in the sample 3012 on the first substrate 3002.

As illustrated in FIG. 2B, a convergent electric field 3042 can be generated when the first conductive surface area of the first substrate 3002 is larger than the second conductive surface area of the second substrate 3004. In the convergent electric field 3042, the analytes 3014 can migrate from the sample 3012 on the first substrate 3002 toward the second substrate 3004 in a converging manner. For example, the analytes 3014 contract or are concentrated while migrating through the convergent electric field 3042 and captured on the second substrate 3004. In this case, the analytes 3014 captured on the second substrate 3004 are considered to be demagnified, compared to the analytes originally included in the sample 3012 on the first substrate 3002.

Magnification or demagnification can be adjusted and controlled by using different sizes of the first electrode of the first substrate 3002 and the second electrode of the second substrate 3004. For example, magnification or demagnification can be adjusting based on a ratio of the first conductive surface area of the first substrate 3002 over the second conductive surface area of the second substrate 3004. By way of example, in implementations where the first and second conductive surface areas are circular, a magnification factor M can be approximated as:

$$M \sim \frac{\text{Radius of Second Conductive Surface Area}}{\text{Radius of First Conductive Surface Area}}$$

In some implementations, the ratio between the first conductive surface area and the second conductive surface area can range between 0.1 and 100. In other implementations, the ratio between the first conductive surface area and the second conductive surface area can range between 0.01 and 1000. Other ratios are also possible.

By way of example, as illustrated in FIG. 2A, the magnification can be increased by providing a larger second conductive surface area of the second substrate 3004 than the second conductive surface area of the second substrate 3004 in FIG. 1. As illustrated in FIG. 2B, a demagnification can occur when the first conductive surface area of the first substrate 3002 is larger than the second conductive surface area of the second substrate 3004.

In addition or alternatively, the distance D between the first substrate 3002 and the second substrate 3004 can be controlled to adjust the magnification or demagnification. Further, the distance D can be controlled to suppress potential low resolution capture of the analytes that may result from lateral diffusion. For example, the distance D can be selected to maintain a diffusion rate of the analytes migrating under a divergent or convergent electric field to be lower than a predetermined value. In some implementations, the distance D can range from 1 um to 10 mm. In other implementations, the distance D can range from 0.1 um to 10 mm.

Figure 3:
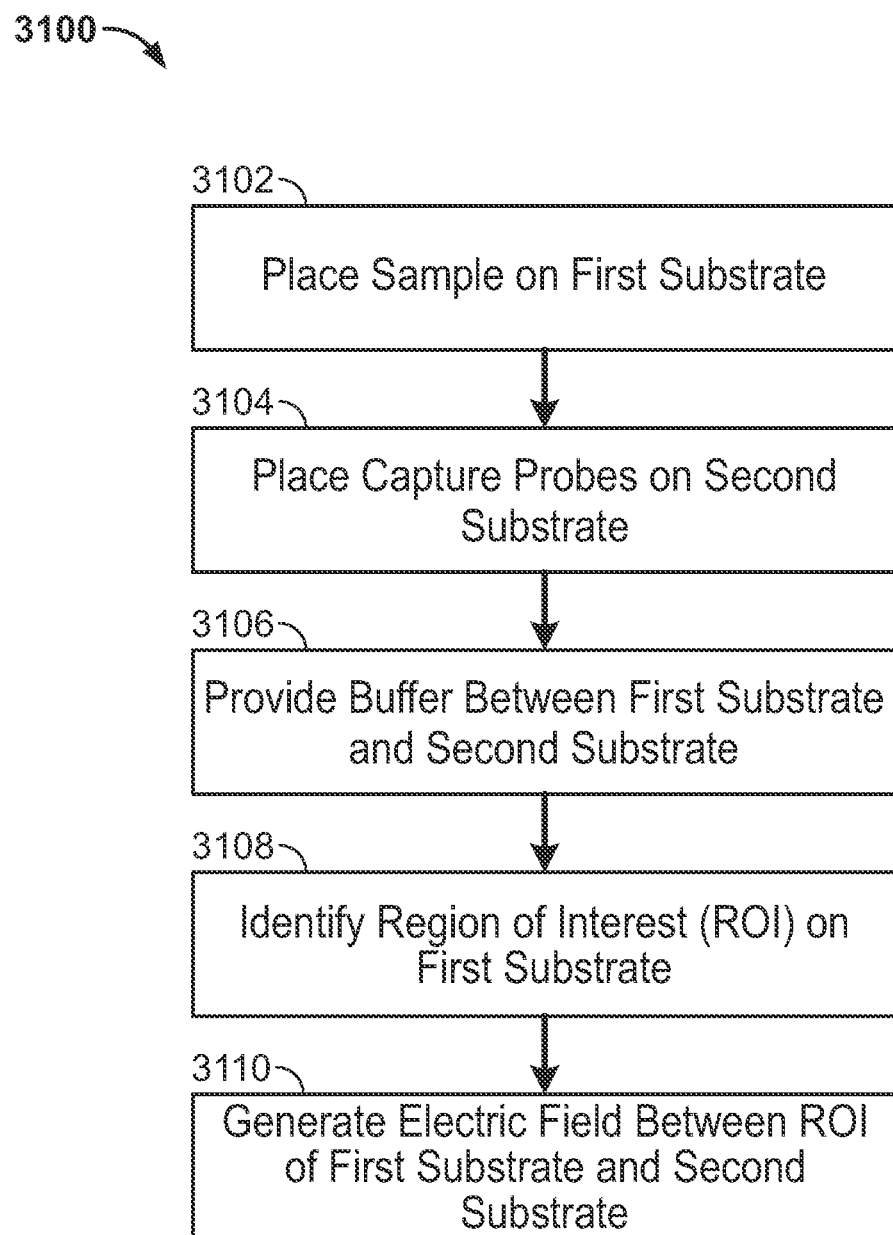
FIG. 3 is a flowchart of an example process for preparing a biological sample.

FIG. 3 is an exemplary flowchart of a process 3100 for capturing analytes from a biological sample on a sample substrate to a capture substrate using electrophoresis. In some implementations, the process 3100 can be performed using the electrophoretic system 3000 described with reference to FIGS. 1 and 2A-B. The process 3100 can include placing a sample on a first substrate (3102) and placing a capture probe on a second substrate (3104). The sample can be placed on the first substrate in various ways described herein. The capture probes can be attached to the second substrate in various ways described herein. The first and second substrates can be configured and used as electrophoretic electrodes. In some implementations, the first and second substrates can be configured as conductive substrates as described herein, such as by including a conductive material in the substrates or providing a conductive coating on an upper or lower surface of the substrates.

As described herein, a conductive surface area of the first substrate is different from a conductive surface area of the second substrate. Where the conductive surface area of the first substrate is smaller than the conductive surface area of the second substrate, a divergent electric field is generated between the first and second substrates, and the analytes can be captured on the second substrate in a magnified way. Where the conductive surface area of the first substrate is larger than the conductive surface area of the second substrate, a convergent electric field is generated between the first and second substrates, the analytes can be captured on the second substrate in a demagnified way.

The process 3100 can include providing a buffer between the first substrate and the second substrate (3106). In some implementations, the process 3100 can include arranging a spacer between the first and second substrates so that the first substrate is arranged at a distance from the second substrate. The distance can be selected to maintain a diffusion rate of the analytes migrating under the electric field to be lower than a predetermined value. As described herein, the spacer can be made of a non-conductive material and used to provide a buffer chamber between the first and second electrodes. The buffer can be contained in a buffer chamber that is provided by the spacer and used to at least partially immerse the first substrate, the second substrate, or both. In some implementations, the buffer can include a permeabilization reagent. The permeabilization reagent can permeabilize the sample before and/or during electrophoresis. In some implementations, this chemical permeabilization can be performed in conjunction with light permeabilization such as those described herein, for example with reference to FIG. 5. In addition or alternatively, the sample can be permeabilized using other methods described herein, independently or in conjunction with permeabilization using the premeabilization reagent and/or the illumination on the sample. Other buffers as described herein can be used in other implementations.

The exemplary process 3100 can include identifying a region of interest (ROI) on the first substrate (3108). The ROI can be selected to target a subset of the sample that is of particular interest and capture the analytes therefrom. The process 3100 can include generating an electric field (e.g., a divergent or convergent electric field) between the ROI of the first substrate and the second substrate (3110). For example, the first substrate can be selectively activated such that only the region of the first substrate corresponding to the ROI can be used as an electrode during electrophoresis. The electric field generated between the ROI of the first substrate and the second substrate can cause analytes to migrate from the ROI of the first substrate toward the second substrate in a diverging or converging manner depending on the type of the electric field (e.g., either a divergent electric field or a convergent electric field). In some implementations, the first substrate includes an array of patterned conductive regions that are selectively activated to correspond to the ROI of the first substrate.

Figure 4:
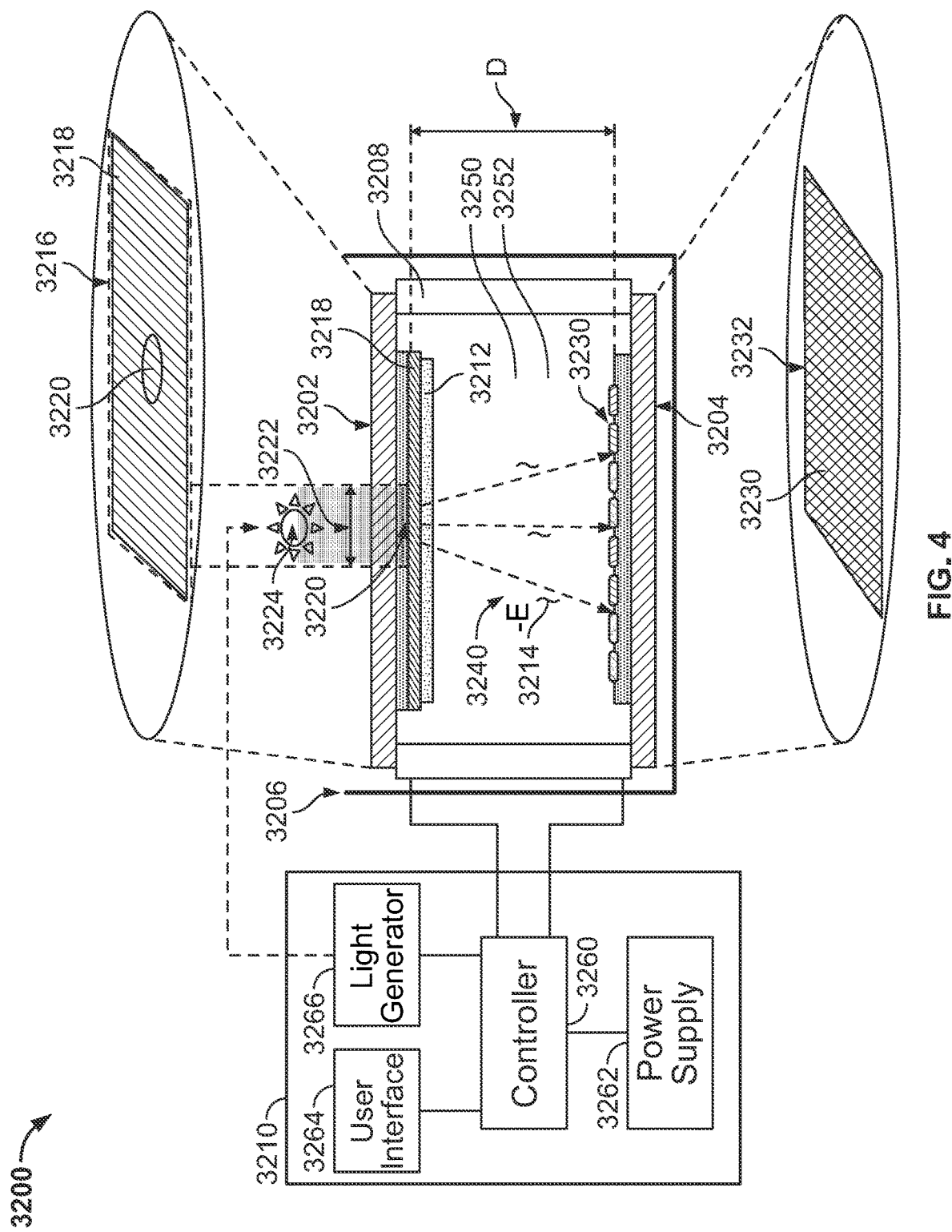
FIG. 4 schematically illustrates another example electrophoretic system for preparing a sample.

Referring to FIG. 4, another exemplary electrophoretic system 3200 is described. In some implementations, the electrophoretic system 3200 can be used to actively cause analytes (e.g., nucleic acids, proteins, charged molecules, etc.) in the sample on a source substrate to migrate to capture probes on a target substrate. The electrophoretic system 3200 can improve spatial resolution of captured analytes by actively directing analytes to diverge or converge toward the target substrate so that the analytes are captured on the target substrate in an expanded (e.g., magnified) or condensed (e.g., demagnified) manner. The electrophoretic system 3200 can use a light-activated conductive material in at least one of the source substrate and the target substrate to select a region of interest on the sample, and/or adjust a degree of magnification or demagnification of the analytes captures on the target substrate. In some implementations, the electrophoretic system 3200 includes a first substrate 3202, a second substrate 3204, an electrophoretic container 3206, a spacer 3208, and a control system 3210.

Referring still to FIG. 4, the first substrate 3202 is configured to receive a sample 3212 that contains analytes 3214. The sample 3212 includes a biological sample, such as a cell or a tissue section including a cell. The first substrate 3202 can include a first substrate region 3216 for receiving the sample 3212 thereon. The sample 3212 can be prepared on the first substrate 3202 in various ways described herein. The first substrate 3202 is configured to be used as a first electrode in the electrophoretic system 3200. For example, the first substrate 3202 can be used as a cathode. In another example, the first substrate 3202 can be used as an anode.

The first substrate 3202 can be conductive at least in the first substrate region 3216. In some implementations, the first substrate 3202 can be configured as a conductive substrate described herein. For example, the first substrate 3202 can include a light-activated conductive material 3218 that is activated to be electrically conductive when exposed to light of predetermined characteristics (e.g., wavelength). An example of such a light-activated conductive material includes amorphous silicon. See, e.g., Valley, J K et al. "Optoelectronic tweezers as a tool for parallel single-cell manipulation and stimulation." IEEE transactions on biomedical circuits and systems vol. 3,6 (2009): 424-31. doi: 10.1109/TBCAS.2009.2031329, which is hereby incorporated by reference in its entirety. Other materials may be used to provide such selective conductivity to the first substrate 3202. The light-activated conductive material 3218 can be coated to be a film or layer on the surface of the first substrate 3202 (e.g., a glass slide), and the sample 3212 is provided on the coating of the substrate 3202.

The light-activated conductive material 3218 on the first substrate 3202 can be selectively activated to adjust the size of the first electrode 3220 in the electrophoretic system 3200. The light-activated conductive material 3218 can be used to create a free form of customized region of interest (ROI) by illuminating a user-defined area on the first substrate. For example, a portion of the light-activated conductive material 3218 can be selected to correspond to a region of interest (ROI) 3222 on the sample 3212, and a beam of light 3224 is illuminated onto the portion of the light-activated conductive material 3218 so that the portion of the light-activated conductive material 3218 beomes conductive and an electric field is generated between the portion of the light-activated conductive material 3218 of the first substrate 3202 and the second substrate 3204.

Although the first substrate 3202 is illustrated to include a single substrate region 3216 in FIG. 4, other implementations of the first substrate 3202 can include a plurality of substrate regions that are configured to place multiple samples thereon, respectively. Each of such multiple substrate regions can be configured similarly to the first substrate region 3216 described herein.

Referring still to FIG. 4, the second substrate 3204 is configured to comprise capture probes 3230. In some implementations, the second substrate 3204 incudes a second substrate region 3232 configured to receive the capture probes 3230. The second substrate 3204 is configured to be used as a second electrode in the electrophoretic system 3200. For example, the second substrate 3204 can be used as an anode. In another example, the second substrate 3204 can be used as a cathode. The capture probe 3230 can be placed on the second substrate region 3232 in a variety of ways described herein. For example, the capture probes 3230 can be directly or indirectly attached to a feature that is fixed on an array. Alternatively or in addition, the capture probes 3230 can be immobilized on the second substrate region 3232 of the second substrate 3204.

The second substrate 3204 can be conductive at least in the second substrate region 3232. In some implementations, the second substrate 3204 can be configured as a conductive substrate described herein. For example, the second substrate 3204 can include one or more conductive materials that permit the second substrate 3204 to function as an electrode. Examples of such a conductive material include, but are not limited to, tin oxide (TO), indium tin oxide (ITO), a transparent conductive oxide (TCO), aluminum doped zinc oxide (AZO), fluorine doped tin oxide (FTO), and any combination thereof. Alternatively or in addition, other materials may be used to provide desired conductivity to the second substrate 3204. In some implementations, the second substrate 3204 can be coated with the conductive material. For example, the second substrate 3204 can include a conductive coating on the surface thereof, and the capture probes 3230 are provided on the coating of the second substrate 3204. The second substrate can include a glass slide coated with a conductive material.

In some implementations, the second substrate 3204 can include an array of conductive regions that are selectively actuated, similarly to the conductive regions 3018 of the first substrate 3002 described in FIG. 1. In some implementations, the second substrate 3204 can have a customized electrode pattern to improve capture uniformity. In other implementations, the second substrate 3204 can include a light-activated conductive material similarly to the first substrate 3202.

In some implementations, the first substrate 3202 (or the first substrate region 3216 thereof) and the second substrate 3204 (or the second substrate region 3232 thereof) can be flat and arranged in parallel with each other. For example, the first conductive surface area of the first substrate 3202 and the second conductive surface area of the second substrate 3204 can be flat and arranged in parallel with each other. Alternatively, at least one of the first substrate 3202 (or the first substrate region 3216 thereof, or the first conductive surface area thereof) and the second substrate 3204 (or the second substrate region 3232 thereof, or the second conductive surface area thereof) is not flat (e.g., curved). In addition or alternatively, the first substrate 3202 (or the first substrate region 3216 thereof, or the first conductive surface area thereof) can be arranged to be angled with the second substrate 3204 (or the second substrate region 3232 thereof, or the second conductive surface area thereof).

In some implementations, the first substrate 3202 (or the first substrate region 3216 thereof, or the first conductive surface area thereof) and the second substrate 3204 (or the second substrate region 3232 thereof, or the second conductive surface area thereof) can be shaped to be concentric circular or spherical disks. Other configurations and arrangements are also possible, such as square or rectangular shapes that are arranged concentrically or non-concentrically.

Referring to FIG. 4, the first substrate 3202 and the second substrate 3204 can be arranged within the electrophoretic container 3206. The electrophoretic container 3206 can provide a buffer chamber 3250 between the first substrate 3202 and the second substrate 3204. The buffer chamber 3250 is configured to contain a buffer 3252. In some implementations, the first substrate 3202 and the second substrate 3204 can be fully immersed into the buffer 3252. In alternative implementations, either or both of the substrates 3202, 3204 can be partially inserted into the buffer 3252 contained in the electrophoretic container 3206.

The buffer 3252 can be of various types. In some implementations, the buffer 3252 includes a permeabilization reagent. The buffer 3252 is contained in the buffer chamber 3250 throughout the electrophoretic process. The permeabilization reagent can permeabilize the sample before and/or during electrophoresis. In some implementations, this chemical permeabilization can be performed in conjunction with light permeabilization such as those described herein, for example with reference to FIG. 5. In addition or alternatively, the sample can be permeabilized using other methods described herein, independently or in conjunction with permeabilization using the premeabilization reagent and/or the illumination on the sample.

The spacer 3208 can be disposed between the first substrate 3202 and the second substrate 3204 to space them apart at a distance D. The spacer 3208 is made of non-conductive material, such as plastic, glass, porcelain, rubber, silicone, etc. The distance D can be determined to provide a desired level of spatial resolution based on several factors, such as the strength and/or duration of electric field generated between the first substrate 3202 and the second substrate 3204, and other parameters described herein.

The control system 3210 operates to generate an electric field (-E) between the first substrate 3202 and the second substrate 3204. The control system 3210 can include a controller 3260 configured to apply a voltage between the first substrate 3202 and the second substrate 3204 using a power supply 3262. The power supply 3262 can include a high voltage power supply. The controller 3260 can be electrically connected to the first substrate 3202 and the second substrate 3204 using electrical wires. The control system 3210 can include a user interface 3264 configured to receive a user input of starting or stopping the electrophoretic process. The user interface 3264 can include various types of input devices, such as physical or virtual buttons, GUI, switches, keypads, keyboard, etc., configured to receive a user input of adjusting operating parameters of the system 3200 or other information associated with the system 3200. Examples of such operating parameters can include a voltage being applied, a duration of such application, etc. In some implementations, the input devices can be used to select a subset of conductive regions 3218 that corresponds to a region of interest (ROI) 3222 on the sample 3212 so that the subset of conductive regions are electrically activated to generate an electric field between the subset of conductive regions 3218 and the second substrate 3204. In addition, the user interface 3264 can include an output device, such as a display, lamps, etc., configured to output the operating parameters of the system 3200 or other information associated with the system 3200.

The control system 3210 can further include a light generator 3266. The light generator 3266 is configured to generate and emit light on the first substrate 3202. Examples of light that can be used include an ultraviolet (UV) light, visible light, or infrared light. In some implementations, the light generator 3266 is manually controllable to be positioned relative to the first substrate 3202, and also manually controllable to generate and emit light to a particular area (e.g., the ROI 3222) on the first substrate 3202. For example, the light generator 3266 can be controlled based on a user input received through the user interface 3264. Alternatively or in addition, the light generator 3266 is configured to automatically adjust its position relative to the first substrate 3202 and generate and emit light toward a particular area (e.g., the ROI 3222) on the first substrate 3202.

The controller 3260 can further control the light generator 3266. In some implementations, the controller 3260 can control the light generator 3266 to arrange or orient the light generator 3266 in a desired position relative to the substrate 3202, and/or generate and project light onto the ROI 3222 so that a portion of the light-activated conductive material 3218 corresponding to the ROI 3222 is activated to be conductive.

Referring still to FIG. 4, in some implementations, the first substrate 3202 has a first conductive surface area that can be used as the first electrode in the electrophoretic system 3200, and the second substrate 3204 has a second conductive surface area that can be used as the second electrode in the electrophoretic system 3200. The first conductive surface area of the first substrate 3202 can be defined by the portion of the light-activated conductive material 3218 that is exposed to the light beam 3224. Where the entire second substrate region 3232 is configured and used for the second electrode, the surface area of the second substrate region 3232 can be the second conductive surface area. Alternatively, where a portion of the second substrate region 3232 is configured and used for the second electrode, the surface area of the portion of the second substrate region 3232 can be the second conductive surface area.

In some implementations, the first conductive surface area of the first substrate 3202 (e.g., the portion of the light-activated conductive material 3218 being exposed to light) is different from the second conductive surface area of the second substrate 3204, so that a divergent or convergent electric field is generated between the first and second conductive surface areas in the electrophoretic system 3200.

As illustrated in FIG. 4, a divergent electric field 3240 can be generated when the first conductive surface area of the first substrate 3202 (e.g., the portion of the light-activated conductive material 3218 being exposed to light) is smaller than the second conductive surface area of the second substrate 3204. In the divergent electric field 3240, the analytes 3214 can migrate from the sample 3212 on the first substrate 3202, toward the second substrate 3204, in a diverging manner. For example, the analytes 3214 are spread out during their travel through the divergent electric field 3240 and captured on the second substrate 3204. In this case, the analytes 3214 captured on the second substrate 3204 are considered to be magnified, compared to those originally included in the sample 3212 on the first substrate 3202.

In contrast, a convergent electric field can be generated when the first conductive surface area of the first substrate 3202 (e.g., the portion of the light-activated conductive material 3218 being exposed to light) is larger than the second conductive surface area of the second substrate 3204. In the convergent electric field, the analytes 3214 can migrate from the sample 3212 on the first substrate 3202, toward the second substrate 3204 in a converging manner. For example, the analytes 3214 can be concentrated while passing through the convergent electric field 3242 and captured on the second substrate 3204. In this case, the analytes 3214 captured on the second substrate 3204 are considered to be demagnified, compared to those originally included in the sample 3212 on the first substrate 3202.

Magnification or demagnification can be controlled by using different sizes of the first electrode of the first substrate 3202 (e.g., the portion of the light-activated conductive material 3218 being exposed to light) and the second electrode of the second substrate 3204. For example, magnification or demagnification can be adjusting based on a ratio of the first conductive surface area of the first substrate 3202 (e.g., the portion of the light-activated conductive material 3218 being exposed to light) over the second conductive surface area of the second substrate 3204. In some implementations, the ratio between the first conductive surface area and the second conductive surface area can range between 0.1 and 100. In other implementations, the ratio between the first conductive surface area and the second conductive surface area can range between 0.01 and 1000. Other ratios are also possible.

In addition or alternatively, the distance D between the first substrate 3202 and the second substrate 3204 can be controlled to adjust the magnification or demagnification. Further, the distance D can be controlled to suppress low resolution capture of the analytes that may result from lateral diffusion. For example, the distance D can be selected to maintain a diffusion rate of the analytes migrating under a divergent or convergent electric field to be lower than a predetermined value. In some implementations, the distance D can range from 1 um to 10 mm. In other implementations, the distance D can range from 0.1 um to 10 mm.

Figure 5:
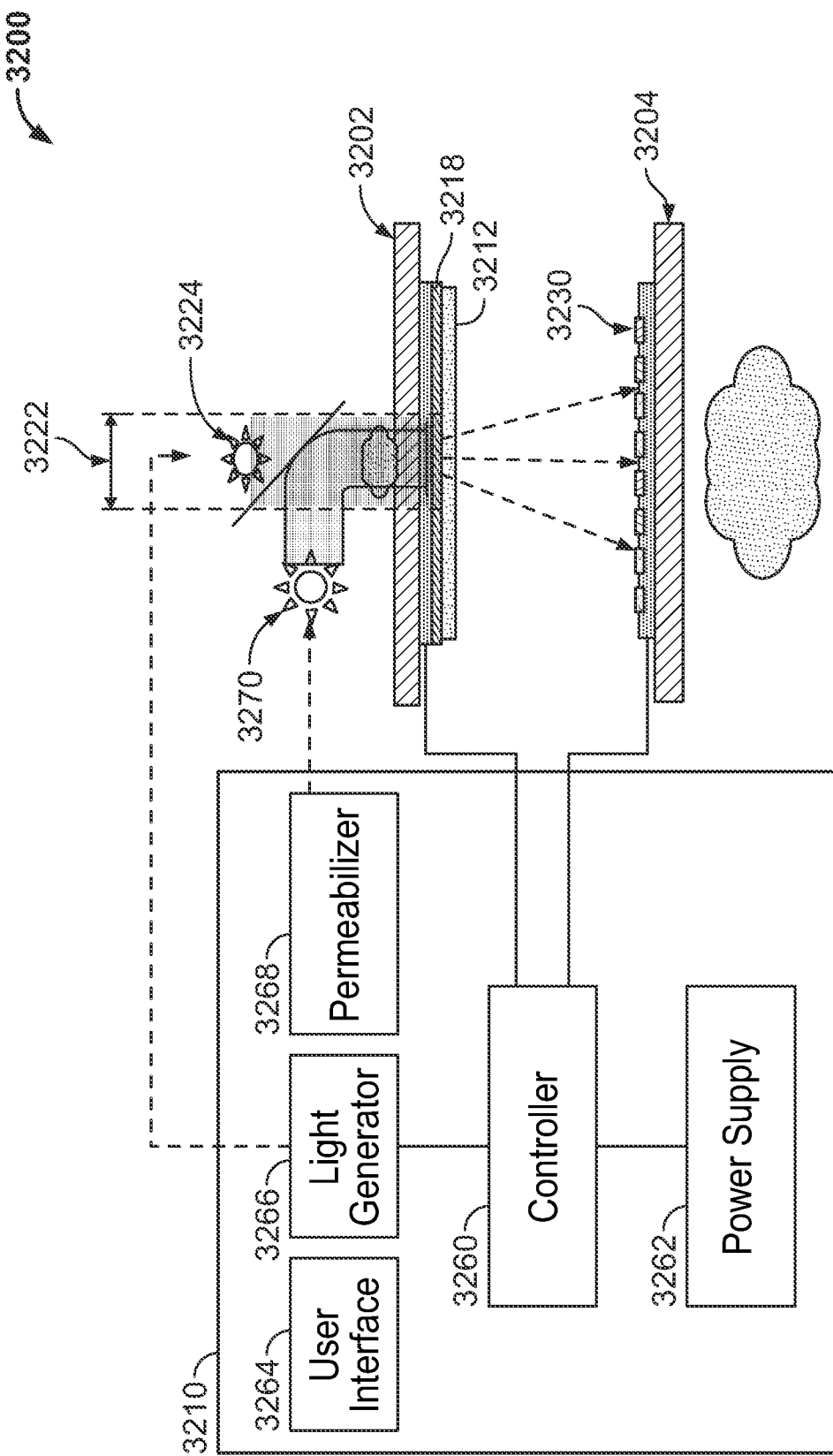
FIG. 5 schematically illustrates the electrophoretic system of FIG. 4 with a mechanism for providing photo-thermal effect to permeabilize a sample.

Referring to FIG. 5, the electrophoretic system 3200 can further include a mechanism for providing photo-thermal effect to permeabilize the sample before, during, or after operation of the electrophoretic system. For example, the control system 3210 includes a permeabilizer 3268 configured to emit a beam of light 3270 (e.g., infrared light) onto the sample placed on the first substrate 3202. In some implementations, the light 3270 can be emitted onto the same area (e.g., corresponding to the ROI 3222) to which the light beam 3224 is emitted toward the portion of the light-activated conductive material 3218. The light beam 3270 can thermally activate permeabilizing enzymes in or in proximity to the sample locally in the ROI region, thereby enhancing migration of the analytes toward the second substrate 3204.

Figure 6:
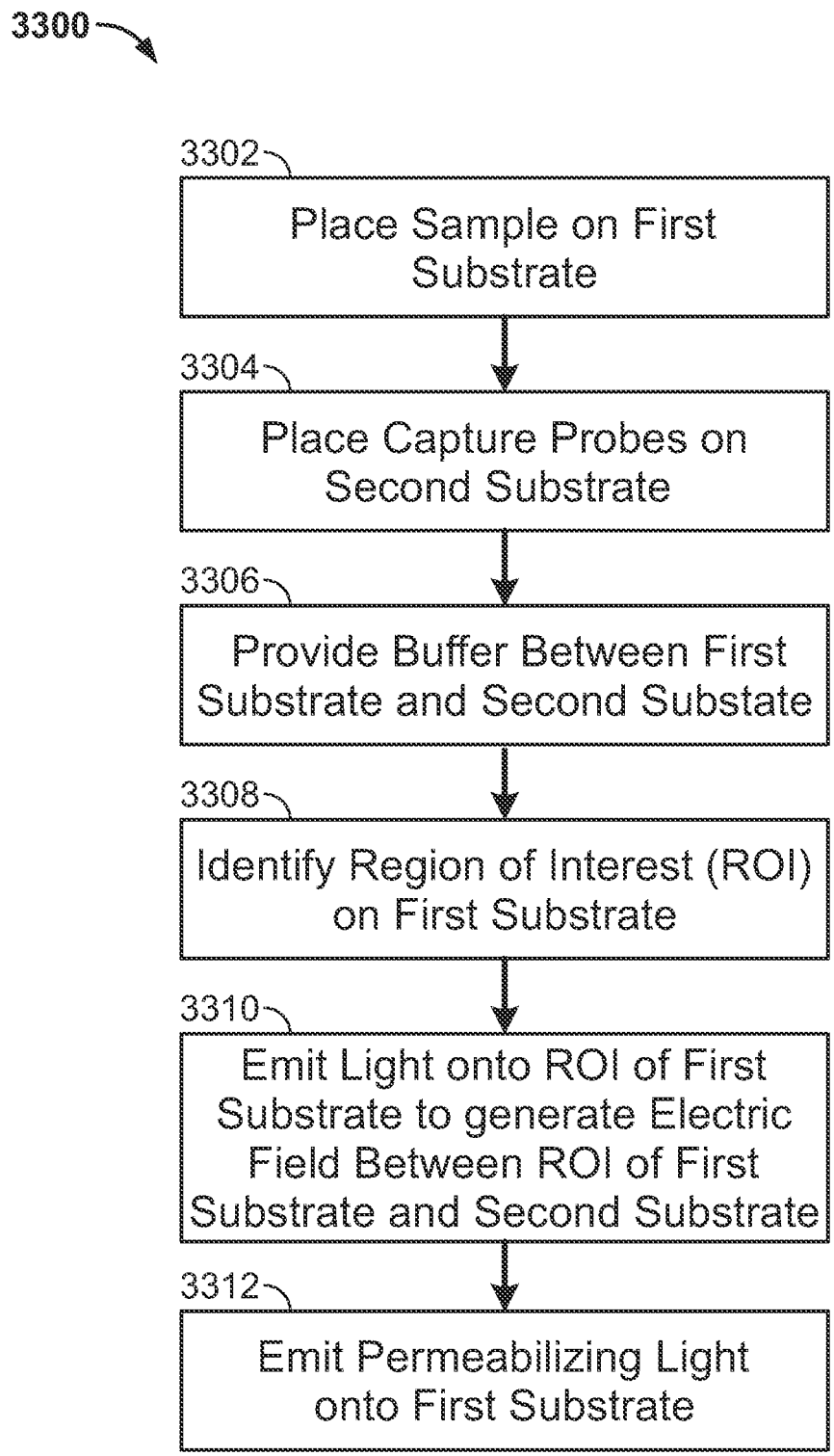
FIG. 6 is a flowchart of an example process for preparing a biological sample.

FIG. 6 is a flowchart of an example process 3300. In some implementations, the process 3300 can be performed using the electrophoretic system 3000 described with reference to FIGS. 2 and 3. The process 3300 can include placing a sample on a first substrate (3302), and placing a capture probe on a second substrate (3304). The sample can be placed on the first substrate in various ways described herein. The capture probe can be attached to the second substrate in various ways described herein. As described herein, the first and second substrates can be configured and used as electrophoretic electrodes. In some implementations, the first and second substrates can be configured as conductive substrates as described herein, such as by including a conductive material in the substrates or providing a conductive coating on an upper or lower surface of the substrates.

As described herein, a conductive surface area of the first substrate is different from a conductive surface area of the second substrate. Where the conductive surface area of the first substrate is smaller than the conductive surface area of the second substrate, a divergent electric field is generated between the first and second substrates, and the analytes can be captured on the second substrate in a magnified way. Where the conductive surface area of the first substrate is larger than the conductive surface area of the second substrate, a convergent electric field is generated between the first and second substrates, the analytes can be captured on the second substrate in a demagnified way.

The process 3300 can include providing a buffer between the first substrate and the second substrate (3306). In some implementations, the process 3300 can include arranging a spacer between the first and second substrates so that the first substrate is arranged at a distance from the second substrate. The distance can be selected to maintain a diffusion rate of the analytes migrating under the electric field to be lower than a predetermined value. As described herein, the spacer can be made of a non-conductive material and used to provide a buffer chamber between the first and second electrodes. The buffer can be contained in a buffer chamber that is provided by the spacer and used to at least partially immerse the first substrate, the second substrate, or both. In some implementations, the buffer can include a permeabilization reagent. The permeabilization reagent can permeabilize the sample before and/or during electrophoresis. In some implementations, this chemical permeabilization can be performed in conjunction with light permeabilization such as those described herein, for example with reference to FIG. 5. In addition or alternatively, the sample can be permeabilized using other methods described herein, independently or in conjunction with permeabilization using the premeabilization reagent and/or the illumination on the sample. Other buffers as described generally herein can be used in other implementations.

The process 3300 can include identifying a region of interest (ROI) on the first substrate (3308). The ROI can be selected to target a subset of the sample that is of particular interest and capture the analytes therefrom. The process 3300 can include generating an electric field (e.g., a divergent or convergent electric field) between the ROI of the first substrate and the second substrate (3310). For example, the first substrate can be selectively activated such that only the region of the first substrate corresponding to the ROI can be used as an electrode in the electrophoresis. The electric field generated between the ROI of the first substrate and the second substrate can cause analytes to migrate from the ROI of the first substrate toward the second substrate in a diverging or converging manner depending on the type of the electric field (e.g., either a divergent electric field or a convergent electric field). In some implementations, the first substrate includes a light-activated conductive film that is activated to be electrically conductive when exposed to light of predetermined wavelength. The light-activated conductive film on the surface of the first substrate can be selectively activated to adjust the size of the first electrode in the electrophoretic system. The light-activated conductive film can be used to create a free form of customized region of interest (ROI) by illuminating a user-defined area on the first substrate.

The process 3300 can include emitting light onto the ROI of the first substrate to generate an electric field between the ROI of the first substrate and the second substrate (3310). For example, the light can be a photoconductive light that is emitted onto the ROI of the first substrate so that the region of the light-activated conductive film corresponding to the ROI is activated to be conductive. The light-emitted region (the ROI) has a size different from the second substrate so that a divergent or convergent electric field is generated between the first substrate and the second substrate.

The process 3300 can include emitting permeabilizing light onto the first substrate (3312). For example, the permeabilizing light (e.g., infrared light) can be illuminated onto the area of the sample that corresponds to the portion of the light-activated conductive film onto which the light is emitted in the step 3310. The permeabilizing light can thermally permeabilize the sample locally, thereby enhancing migration of the analytes toward the second substrate.

In some implementations, the permeabilizing light can have a wavelength close to infrared or in infrared (e.g., 1.5-2.0 um wavelengths). The photoconductive light can have a wavelength on UV or visible ranges.

Figure 7:
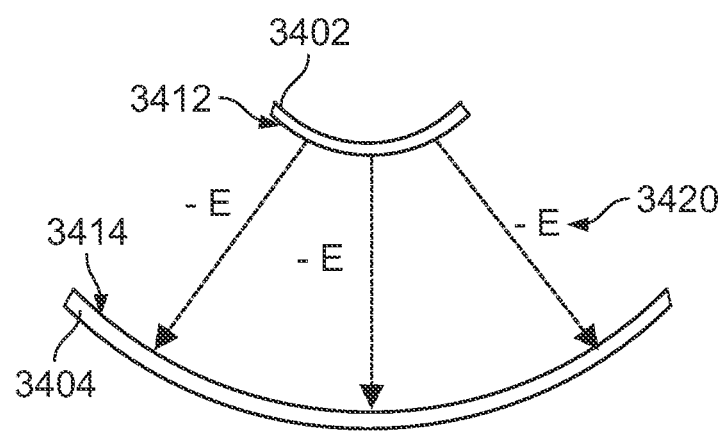
FIG. 7 illustrates an example configuration of electrodes that can be used in the electrophoretic system.

FIG. 7 illustrates an example configuration of electrodes that can be used in the electrophoretic system described herein. In the illustrated example, a first electrode 3402 is a source electrode, and a second electrode 3404 is a target or capture electrode.

The first electrode 3402 can represent the first substrate 3002, 3402. Alternatively, the first electrode 3402 can represent the first substrate region 3016, 3216. Alternatively, the first electrode 3402 can represent the first conductive surface area of the first substrate 3002 described herein. For example, the first electrode 3402 can represent a portion of the conductive regions 3018 of the first substrate 3002 that is activated to be the first conductive surface area, as described herein. Alternatively, the first electrode 3402 can represent a portion of the light-activated conductive material 3218 that is light-activated to be conductive, as described herein.

The second electrode 3404 can represent the second substrate 3004, 3404. Alternatively, the second electrode 3404 can represent the second substrate region 3032, 3232. Alternatively, the second electrode 3404 can represent the second conductive surface area of the second substrate 3004 described herein.

In some implementations, as illustrated in FIG. 7, the first electrode 3402 can provide a first spherical surface 3412, and the second electrode 3404 can provide a second spherical surface 3414. The first electrode 3402 and the second electrode 3404 can be disposed concentrically so that an electric field 3420 is uniformly created without distortion between any location of the first spherical surface 3412 of the first electrode 3402 and its corresponding location of the second spherical surface 3414 of the second electrode 3404.

In other implementations, as illustrated in FIGS. 1, 2A-B, 4, and 5, the first electrode 3402 and the second electrode 3404 can be planar and arranged to be parallel with each other. The first electrode 3402 and the second electrode 3404 can be of various shapes, such as circular, rectangular, square, or triangular disks or plates. In some implementations, a potential electric field distortion that may result from the shapes of the first and second electrodes can be used to reconstruct an undistorted profile of the captured analyte.

In yet other implementations, a combination of different shapes of the first electrode 3402 and the second electrode 3404 can be used.

In some implementations, the sizes (e.g., length or diameter) of the first and second electrodes 3402, 3404 can range from 1 um to 10 mm. In other implementations, the sizes (e.g., length or diameter) of the first and second electrodes 3402, 3404 can range from 5 um to 1 cm. In some implementations, the distance between the first and second electrodes 3402, 3404 can range from 1 um to 1 cm. In other implementations, the distance between the first and second electrodes 3402, 3404 can range from 0.1 um to 10 mm.

Figure 8:
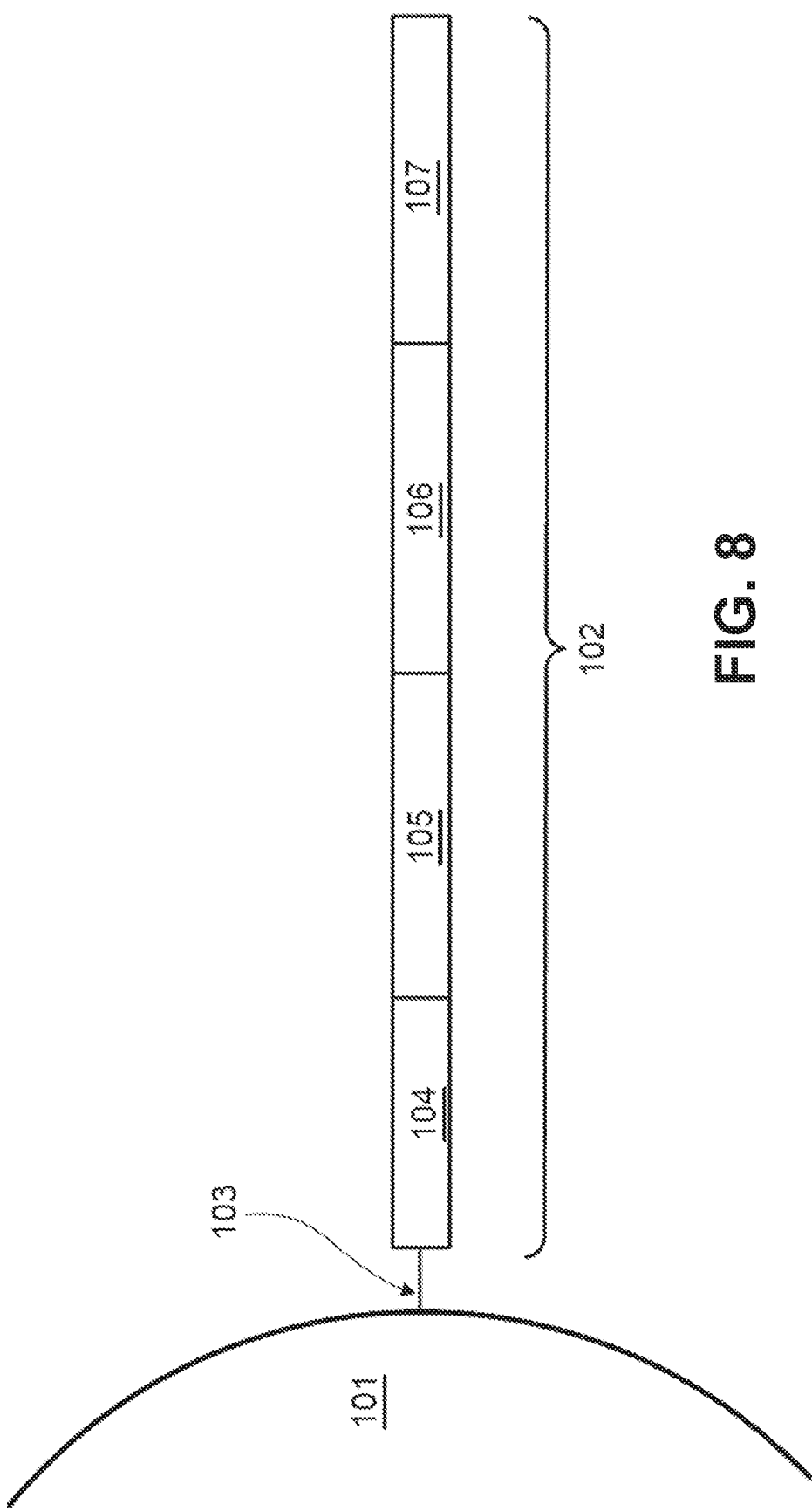
FIG. 8 is a schematic diagram showing an example of a barcoded capture probe, as described herein.

FIG. 8 is a schematic diagram showing an exemplary capture probe, as described herein. As shown, the capture probe 102 is optionally coupled to a feature 101 by a cleavage domain 103, such as a disulfide linker. The capture probe can include a functional sequence 104 that are useful for subsequent processing. The functional sequence 104 can include all or a part of sequencer specific flow cell attachment sequence (e.g., a P5 or P7 sequence), all or a part of a sequencing primer sequence, (e.g., a R1 primer binding site, a R2 primer binding site), or combinations thereof. The capture probe can also include a spatial barcode 105. The capture probe can also include a unique molecular identifier (UMI) sequence 106. While FIG. 8 shows the spatial barcode 105 as being located upstream (5') of UMI sequence 106, it is to be understood that capture probes wherein UMI sequence 106 is located upstream (5') of the spatial barcode 105 is also suitable for use in any of the methods described herein. The capture probe can also include a capture domain 107 to facilitate capture of a target analyte. In some embodiments, the capture probe comprises one or more additional functional sequences that can be located, for example between the spatial barcode 105 and the UMI sequence 106, between the UMI sequence 106 and the capture domain 107, or following the capture domain 107. The capture domain can have a sequence complementary to a sequence of a nucleic acid analyte. The capture domain can have a sequence complementary to a connected probe described herein. The capture domain can have a sequence complementary to a capture handle sequence present in an analyte capture agent. The capture domain can have a sequence complementary to a splint oligonucleotide. Such splint oligonucleotide, in addition to having a sequence complementary to a capture domain of a capture probe, can have a sequence of a nucleic acid analyte, a sequence complementary to a portion of a connected probe described herein, and/or a capture handle sequence described herein.

The functional sequences can generally be selected for compatibility with any of a variety of different sequencing systems, e.g., Ion Torrent Proton or PGM, Illumina sequencing instruments, PacBio, Oxford Nanopore, etc., and the requirements thereof. In some embodiments, functional sequences can be selected for compatibility with non-commercialized sequencing systems. Examples of such sequencing systems and techniques, for which suitable functional sequences can be used, include (but are not limited to) Ion Torrent Proton or PGM sequencing, Illumina sequencing, PacBio SMRT sequencing, and Oxford Nanopore sequencing. Further, in some embodiments, functional sequences can be selected for compatibility with other sequencing systems, including non-commercialized sequencing systems.

In some embodiments, the spatial barcode 105 and functional sequences 104 is common to all of the probes attached to a given feature. In some embodiments, the UMI sequence 106 of a capture probe attached to a given feature is different from the UMI sequence of a different capture probe attached to the given feature.

Spatial analysis methodologies and compositions described herein can provide a vast amount of analyte and/or expression data for a variety of analytes within a biological sample at high spatial resolution, while retaining native spatial context. Spatial analysis methods and compositions can include, e.g., the use of a capture probe including a spatial barcode (e.g., a nucleic acid sequence that provides information as to the location or position of an analyte within a cell or a tissue sample (e.g., mammalian cell or a mammalian tissue sample) and a capture domain that is capable of binding to an analyte (e.g., a protein and/or a nucleic acid) produced by and/or present in a cell. Spatial analysis methods and compositions can also include the use of a capture probe having a capture domain that captures an intermediate agent for indirect detection of an analyte. For example, the intermediate agent can include a nucleic acid sequence (e.g., a barcode) associated with the intermediate agent. Detection of the intermediate agent is therefore indicative of the analyte in the cell or tissue sample.

Non-limiting aspects of spatial analysis methodologies and compositions are described in U.S. Pat. Nos. 10,774, 374, 10,724,078, 10,480,022, 10,059,990, 10,041,949, 10,002,316, 9,879,313, 9,783,841, 9,727,810, 9,593,365, 8,951,726, 8,604,182, 7,709,198, U.S. Patent Application Publication Nos. 2020/239946, 2020/080136, 2020/0277663, 2020/024641, 2019/330617, 2019/264268, 2020/256867, 2020/224244, 2019/194709, 2019/161796, 2019/085383, 2019/055594, 2018/216161, 2018/051322, 2018/0245142, 2017/241911, 2017/089811, 2017/067096, 2017/029875, 2017/0016053, 2016/108458, 2015/000854, 2013/171621, WO 2018/091676, WO 2020/176788, Rodrigues et al., Science 363(6434):1463-1467, 2019; Lee et al., Nat. Protoc. 10(3):442-458, 2015; Trejo et al., PLoS ONE 14(2): e0212031, 2019; Chen et al., Science 348(6233):aaa6090, 2015; Gao et al., BMC Biol. 15:50, 2017; and Gupta et al., Nature Biotechnol. 36:1197-1202, 2018; the Visium Spatial Gene Expression Reagent Kits User Guide (e.g., Rev C, dated June 2020), and/or the Visium Spatial Tissue Optimization Reagent Kits User Guide (e.g., Rev C, dated July 2020), both of which are available at the 10× Genomics Support Documentation website, and can be used herein in any combination. Further non-limiting aspects of spatial analysis methodologies and compositions are described herein.

Some general terminology that may be used in this disclosure can be found in Section (I)(b) of WO 2020/176788 and/or U.S. Patent Application Publication No. 2020/0277663. Typically, a "barcode" is a label, or identifier, that conveys or is capable of conveying information (e.g., information about an analyte in a sample, a bead, and/or a capture probe). A barcode can be part of an analyte, or independent of an analyte. A barcode can be attached to an analyte. A particular barcode can be unique relative to other barcodes. For the purpose of this disclosure, an "analyte" can include any biological substance, structure, moiety, or component to be analyzed. The term "target" can similarly refer to an analyte of interest.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral proteins (e.g., viral capsid, viral envelope, viral coat, viral accessory, viral glycoproteins, viral spike, etc.), extracellular and intracellular proteins, antibodies, and antigen binding fragments. In some embodiments, the analyte(s) can be localized to subcellular location(s), including, for example, organelles, e.g., mitochondria, Golgi apparatus, endoplasmic reticulum, chloroplasts, endocytic vesicles, exocytic vesicles, vacuoles, lysosomes, etc. In some embodiments, analyte(s) can be peptides or proteins, including without limitation antibodies and enzymes. Additional examples of analytes can be found in Section (I)(c) of WO 2020/176788 and/or U.S. Patent Application Publication No. 2020/0277663. In some embodiments, an analyte can be detected indirectly, such as through detection of an intermediate agent, for example, a ligation product or an analyte capture agent (e.g., an oligonucleotide-conjugated antibody), such as those described herein.

A "biological sample" is typically obtained from the subject for analysis using any of a variety of techniques including, but not limited to, biopsy, surgery, and laser capture microscopy (LCM), and generally includes cells and/or other biological material from the subject. In some embodiments, a biological sample can be a tissue section. In some embodiments, a biological sample can be a fixed and/or stained biological sample (e.g., a fixed and/or stained tissue section). Non-limiting examples of stains include histological stains (e.g., hematoxylin and/or eosin) and immunological stains (e.g., fluorescent stains). In some embodiments, a biological sample (e.g., a fixed and/or stained biological sample) can be imaged. Biological samples are also described in Section (I)(d) of WO 2020/176788 and/or U.S. Patent Application Publication No. 2020/0277663.

In some embodiments, a biological sample is permeabilized with one or more permeabilization reagents. For example, permeabilization of a biological sample can facilitate analyte capture. Exemplary permeabilization agents and conditions are described in Section (I)(d)(ii)(13) or the Exemplary Embodiments Section of WO 2020/176788 and/or U.S. Patent Application Publication No. 2020/0277663.

Array-based spatial analysis methods involve the transfer of one or more analytes from a biological sample to an array of features on a substrate, where each feature is associated with a unique spatial location on the array. Subsequent analysis of the transferred analytes includes determining the identity of the analytes and the spatial location of the analytes within the biological sample. The spatial location of an analyte within the biological sample is determined based on the feature to which the analyte is bound (e.g., directly or indirectly) on the array, and the feature's relative spatial location within the array.

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe includes a barcode (e.g., a spatial barcode and/or a unique molecular identifier (UMI)) and a capture domain). In some embodiments, a capture probe can include a cleavage domain and/or a functional domain (e.g., a primer-binding site, such as for next-generation sequencing (NGS)). See, e.g., Section (II)(b) (e.g., subsections (i)-(vi)) of WO 2020/176788 and/or U.S. Patent Application Publication No. 2020/0277663. Generation of capture probes can be achieved by any appropriate method, including those described in Section (II)(d)(ii) of WO 2020/176788 and/or U.S. Patent Application Publication No. 2020/0277663.

In some embodiments, more than one analyte type (e.g., nucleic acids and proteins) from a biological sample can be detected (e.g., simultaneously or sequentially) using any appropriate multiplexing technique, such as those described in Section (IV) of WO 2020/176788 and/or U.S. Patent Application Publication No. 2020/0277663.

In some embodiments, detection of one or more analytes (e.g., protein analytes) can be performed using one or more analyte capture agents. As used herein, an "analyte capture agent" refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) an analyte capture sequence. As used herein, the term "analyte binding moiety barcode" refers to a barcode that is associated with or otherwise identifies the analyte binding moiety. As used herein, the term "analyte capture sequence" refers to a region or moiety configured to hybridize to, bind to, couple to, or otherwise interact with a capture domain of a capture probe. In some cases, an analyte binding moiety barcode (or portion thereof) may be able to be removed (e.g., cleaved) from the analyte capture agent. Additional description of analyte capture agents can be found in Section (II)(b)(ix) of WO 2020/176788 and/or Section (II)(b)(viii) U.S. Patent Application Publication No. 2020/0277663.

There are at least two methods to associate a spatial barcode with one or more neighboring cells, such that the spatial barcode identifies the one or more cells, and/or contents of the one or more cells, as associated with a particular spatial location. One method is to promote analytes or analyte proxies (e.g., intermediate agents) out of a cell and towards a spatially-barcoded array (e.g., including spatially-barcoded capture probes). Another method is to cleave spatially-barcoded capture probes from an array and promote the spatially-barcoded capture probes towards and/or into or onto the biological sample.

In some cases, capture probes may be configured to prime, replicate, and consequently yield optionally barcoded extension products from a template (e.g., a DNA or RNA template, such as an analyte or an intermediate agent (e.g., a ligation product or an analyte capture agent), or a portion thereof), or derivatives thereof (see, e.g., Section (II)(b)(vii) of WO 2020/176788 and/or U.S. Patent Application Publication No. 2020/0277663 regarding extended capture probes). In some cases, capture probes may be configured to form ligation products with a template (e.g., a DNA or RNA template, such as an analyte or an intermediate agent, or portion thereof), thereby creating ligations products that serve as proxies for a template.

As used herein, an "extended capture probe" refers to a capture probe having additional nucleotides added to the terminus (e.g., 3' or 5' end) of the capture probe thereby extending the overall length of the capture probe. For example, an "extended 3' end" indicates additional nucleotides were added to the most 3' nucleotide of the capture probe to extend the length of the capture probe, for example, by polymerization reactions used to extend nucleic acid molecules including templated polymerization catalyzed by a polymerase (e.g., a DNA polymerase or a reverse transcriptase). In some embodiments, extending the capture probe includes adding to a 3' end of a capture probe a nucleic acid sequence that is complementary to a nucleic acid sequence of an analyte or intermediate agent specifically bound to the capture domain of the capture probe. In some embodiments, the capture probe is extended using reverse transcription. In some embodiments, the capture probe is extended using one or more DNA polymerases. The extended capture probes include the sequence of the capture probe and the sequence of the spatial barcode of the capture probe.

In some embodiments, extended capture probes are amplified (e.g., in bulk solution or on the array) to yield quantities that are sufficient for downstream analysis, e.g., via DNA sequencing. In some embodiments, extended capture probes (e.g., DNA molecules) act as templates for an amplification reaction (e.g., a polymerase chain reaction).

Additional variants of spatial analysis methods, including in some embodiments, an imaging step, are described in Section (II)(a) of WO 2020/176788 and/or U.S. Patent Application Publication No. 2020/0277663. Analysis of captured analytes (and/or intermediate agents or portions thereof), for example, including sample removal, extension of capture probes, sequencing (e.g., of a cleaved extended capture probe and/or a cDNA molecule complementary to an extended capture probe), sequencing on the array (e.g., using, for example, in situ hybridization or in situ ligation approaches), temporal analysis, and/or proximity capture, is described in Section (II)(g) of WO 2020/176788 and/or U.S. Patent Application Publication No. 2020/0277663. Some quality control measures are described in Section (II)(h) of WO 2020/176788 and/or U.S. Patent Application Publication No. 2020/0277663.

Spatial information can provide information of biological and/or medical importance. For example, the methods and compositions described herein can allow for: identification of one or more biomarkers (e.g., diagnostic, prognostic, and/or for determination of efficacy of a treatment) of a disease or disorder; identification of a candidate drug target for treatment of a disease or disorder; identification (e.g., diagnosis) of a subject as having a disease or disorder; identification of stage and/or prognosis of a disease or disorder in a subject; identification of a subject as having an increased likelihood of developing a disease or disorder; monitoring of progression of a disease or disorder in a subject; determination of efficacy of a treatment of a disease or disorder in a subject; identification of a patient subpopulation for which a treatment is effective for a disease or disorder; modification of a treatment of a subject with a disease or disorder; selection of a subject for participation in a clinical trial; and/or selection of a treatment for a subject with a disease or disorder.

Spatial information can provide information of biological importance. For example, the methods and compositions described herein can allow for: identification of transcriptome and/or proteome expression profiles (e.g., in healthy and/or diseased tissue); identification of multiple analyte types in close proximity (e.g., nearest neighbor analysis); determination of up- and/or down-regulated genes and/or proteins in diseased tissue; characterization of tumor microenvironments; characterization of tumor immune responses; characterization of cells types and their co-localization in tissue; and identification of genetic variants within tissues (e.g., based on gene and/or protein expression profiles associated with specific disease or disorder biomarkers).

Typically, for spatial array-based methods, a substrate functions as a support for direct or indirect attachment of capture probes to features of the array. A "feature" is an entity that acts as a support or repository for various molecular entities used in spatial analysis. In some embodiments, some or all of the features in an array are functionalized for analyte capture. Exemplary substrates are described in Section (II)(c) of WO 2020/176788 and/or U.S. Patent Application Publication No. 2020/0277663. Exemplary features and geometric attributes of an array can be found in Sections (II)(d)(i), (II)(d)(iii), and (II)(d)(iv) of WO 2020/176788 and/or U.S. Patent Application Publication No. 2020/0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) comprising capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No.

In some cases, spatial analysis can be performed by attaching and/or introducing a molecule (e.g., a peptide, a lipid, or a nucleic acid molecule) having a barcode (e.g., a spatial barcode) to a biological sample (e.g., to a cell in a biological sample). In some embodiments, a plurality of molecules (e.g., a plurality of nucleic acid molecules) having a plurality of barcodes (e.g., a plurality of spatial barcodes) are introduced to a biological sample (e.g., to a plurality of cells in a biological sample) for use in spatial analysis. In some embodiments, after attaching and/or introducing a molecule having a barcode to a biological sample, the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

In some cases, spatial analysis can be performed by detecting multiple oligonucleotides that hybridize to an analyte. In some instances, for example, spatial analysis can be performed using RNA-templated ligation (RTL). Methods of RTL have been described previously. See, e.g., Credle et al., *Nucleic Acids Res.* 2017 Aug. 21; 45(14):e128. Typically, RTL includes hybridization of two oligonucleotides to adjacent sequences on an analyte (e.g., an RNA molecule, such as an mRNA molecule). In some instances, the oligonucleotides are DNA molecules. In some instances, one of the oligonucleotides includes at least two ribonucleic acid bases at the 3' end and/or the other oligonucleotide includes a phosphorylated nucleotide at the 5' end. In some instances, one of the two oligonucleotides includes a capture domain (e.g., a poly(A) sequence, a non-homopolymeric sequence). After hybridization to the analyte, a ligase (e.g., SplintR ligase) ligates the two oligonucleotides together, creating a ligation product. In some instances, the two oligonucleotides hybridize to sequences that are not adjacent to one another. For example, hybridization of the two oligonucleotides creates a gap between the hybridized oligonucleotides. In some instances, a polymerase (e.g., a DNA polymerase) can extend one of the oligonucleotides prior to ligation. After ligation, the ligation product is released from the analyte. In some instances, the ligation product is released using an endonuclease (e.g., RNAse H). The released ligation product can then be captured by capture probes (e.g., instead of direct capture of an analyte) on an array, optionally amplified, and sequenced, thus determining the location and optionally the abundance of the analyte in the biological sample.

During analysis of spatial information, sequence information for a spatial barcode associated with an analyte is obtained, and the sequence information can be used to provide information about the spatial distribution of the analyte in the biological sample. Various methods can be used to obtain the spatial information. In some embodiments, specific capture probes and the analytes they capture are associated with specific locations in an array of features on a substrate. For example, specific spatial barcodes can be associated with specific array locations prior to array fabrication, and the sequences of the spatial barcodes can be stored (e.g., in a database) along with specific array location information, so that each spatial barcode uniquely maps to a particular array location.

Alternatively, specific spatial barcodes can be deposited at predetermined locations in an array of features during fabrication such that at each location, only one type of spatial barcode is present so that spatial barcodes are uniquely associated with a single feature of the array. Where necessary, the arrays can be decoded using any of the methods described herein so that spatial barcodes are uniquely associated with array feature locations, and this mapping can be stored as described above.

When sequence information is obtained for capture probes and/or analytes during analysis of spatial information, the locations of the capture probes and/or analytes can be determined by referring to the stored information that uniquely associates each spatial barcode with an array feature location. In this manner, specific capture probes and captured analytes are associated with specific locations in the array of features. Each array feature location represents a position relative to a coordinate reference point (e.g., an array location, a fiducial marker) for the array. Accordingly, each feature location has an "address" or location in the coordinate space of the array.

Some exemplary spatial analysis workflows are described in the Exemplary Embodiments section of WO 2020/176788 and/or U.S. Patent Application Publication No. 2020/0277663. See, for example, the Exemplary embodiment starting with "In some non-limiting examples of the workflows described herein, the sample can be immersed . . . " of WO 2020/176788 and/or U.S. Patent Application Publication No. 2020/0277663. See also, e.g., the Visium Spatial Gene Expression Reagent Kits User Guide (e.g., Rev C, dated June 2020), and/or the Visium Spatial Tissue Optimization Reagent Kits User Guide (e.g., Rev C, dated July 2020).

In some embodiments, spatial analysis can be performed using dedicated hardware and/or software, such as any of the systems described in Sections (II)(e)(ii) and/or (V) of WO 2020/176788 and/or U.S. Patent Application Publication No. 2020/0277663, or any of one or more of the devices or methods described in Sections *Control Slide for Imaging, Methods of Using Control Slides and Substrates for, Systems of Using Control Slides and Substrates for Imaging, and/or Sample and Array Alignment Devices and Methods, Informational labels* of WO 2020/123320.

Suitable systems for performing spatial analysis can include components such as a chamber (e.g., a flow cell or sealable, fluid-tight chamber) for containing a biological sample. The biological sample can be mounted for example, in a biological sample holder. One or more fluid chambers can be connected to the chamber and/or the sample holder via fluid conduits, and fluids can be delivered into the chamber and/or sample holder via fluidic pumps, vacuum sources, or other devices coupled to the fluid conduits that create a pressure gradient to drive fluid flow. One or more valves can also be connected to fluid conduits to regulate the flow of reagents from reservoirs to the chamber and/or sample holder.

The systems can optionally include a control unit that includes one or more electronic processors, an input interface, an output interface (such as a display), and a storage unit (e.g., a solid state storage medium such as, but not limited to, a magnetic, optical, or other solid state, persistent, writeable and/or re-writeable storage medium). The control unit can optionally be connected to one or more remote devices via a network. The control unit (and components thereof) can generally perform any of the steps and functions described herein. Where the system is connected to a remote device, the remote device (or devices) can perform any of the steps or features described herein. The systems can optionally include one or more detectors (e.g., CCD, CMOS) used to capture images. The systems can also optionally include one or more light sources (e.g., LED-based, diode-based, lasers) for illuminating a sample, a substrate with features, analytes from a biological sample captured on a substrate, and various control and calibration media.

The systems can optionally include software instructions encoded and/or implemented in one or more of tangible storage media and hardware components such as application specific integrated circuits. The software instructions, when executed by a control unit (and in particular, an electronic processor) or an integrated circuit, can cause the control unit, integrated circuit, or other component executing the software instructions to perform any of the method steps or functions described herein.

In some cases, the systems described herein can detect (e.g., register an image) the biological sample on the array. Exemplary methods to detect the biological sample on an array are described in PCT Application No. 2020/061064 and/or U.S. patent application Ser. No. 16/951,854.

Prior to transferring analytes from the biological sample to the array of features on the substrate, the biological sample can be aligned with the array. Alignment of a biological sample and an array of features including capture probes can facilitate spatial analysis, which can be used to detect differences in analyte presence and/or level within different positions in the biological sample, for example, to generate a three-dimensional map of the analyte presence and/or level. Exemplary methods to generate a two- and/or three-dimensional map of the analyte presence and/or level are described in PCT Application No. 2020/053655 and spatial analysis methods are generally described in WO 2020/061108 and/or U.S. patent application Ser. No. 16/951, 864.

In some cases, a map of analyte presence and/or level can be aligned to an image of a biological sample using one or more fiducial markers, e.g., objects placed in the field of view of an imaging system which appear in the image produced, as described in the Substrate Attributes Section, *Control Slide for Imaging* Section of WO 2020/123320, PCT Application No. 2020/061066, and/or U.S. patent application Ser. No. 16/951,843. Fiducial markers can be used as a point of reference or measurement scale for alignment (e.g., to align a sample and an array, to align two substrates, to determine a location of a sample or array on a substrate relative to a fiducial marker) and/or for quantitative measurements of sizes and/or distances.

The invention claimed is:

1. A method for capturing analytes from a biological sample, the method comprising:
   aligning a first substrate and a second substrate, wherein the first substrate comprises the biological sample mounted on a first substrate region of the first substrate, the first substrate region including an array of selectively actuated conductive regions, the biological sample comprising the analytes, and wherein the second substrate comprises a second substrate region comprising capture probes;
   providing a buffer between the first substrate region and the second substrate region;
   selecting one or more of the selectively actuated conductive regions, such that a first surface area covered by the selected one or more of the selectively actuated conductive regions is different from a second surface area of the second substrate region; and
   generating an electric field between the selected one or more of the selectively actuated conductive regions first substrate region and the second substrate region to cause the analytes in the biological sample to migrate from the first substrate region toward the capture probes on the second substrate region.

2. The method of claim 1, further comprising:
   emitting a first light onto at least a portion of the first substrate region of the first substrate to permit for the at least a portion of the first substrate region to be electrically conductive; and
   emitting a second light onto the at least a portion of the first substrate region to permeabilize the biological sample on the at least a portion of the first substrate region.

3. The method of claim 2, wherein the first light is one of an ultraviolet (UV) light, visible light, or infrared light.

4. The method of claim 2, wherein the second light is an infrared light.

5. The method of claim 1, wherein generating the electric field comprises selectively activating the selected one or more of the selectively actuated conductive regions of the array of selectively actuated conductive regions.

6. The method of claim 5, further comprising:
   identifying a region of interest in the biological sample, wherein the selected one or more of the selectively actuated conductive regions corresponds to the identified region of interest; and wherein the generating the electric field further comprises actuating the selected one or more of the selectively actuated conductive regions of the array of selectively actuated conductive regions.

7. The method of claim 6, wherein the first surface area of the first substrate region is smaller than the second surface area of the second substrate region such that the electric field is configured to be a divergent electric field, wherein analytes from the region of interest in the biological sample are magnified upon capture on the second substrate region.

8. The method of claim 6, wherein the first surface area of the first substrate region is larger than the second surface area of the second substrate region such that the electric field is configured to be a convergent electric field, wherein analytes from the region of interest in the biological sample are demagnified upon capture on the second substrate region.

9. The method of claim 6, further comprising:
restricting the electric field from being generated between the first substrate region and the second substrate region at other regions than the identified region of interest.

10. The method of claim 9, wherein the restricting the electric field comprises:
applying a voltage across only portions of the first substrate region and the second substrate region that correspond to the identified region of interest.

11. The method of claim 1, wherein the first substrate is spaced apart at a distance from the second substrate, wherein the distance is selected to maintain a diffusion rate of the analytes migrating under the electric field, wherein the diffusion rate is lower than a predetermined value.

12. The method of claim 11, wherein the distance ranges from 1 μm to 10 mm.

13. The method of claim 1, wherein the first substrate is arranged at an angle to the second substrate.

14. The method of claim 1, wherein the first substrate is arranged to be parallel with the second substrate.

15. The method of claim 1, wherein the first substrate region and the second substrate region are shaped to be concentric circular disks.

16. The method of claim 1, wherein the first substrate region and the second substrate region are shaped to be concentrically spherical.

17. The method of claim 1, wherein the first substrate and the second substrate comprise glass slides coated with a conductive material.

18. The method of claim 17, wherein the conductive material is a photoconductive material.

19. The method of claim 18, wherein the photoconductive material is an amorphous silicon.

20. The method of claim 18, wherein the conductive material includes at least one of tin oxide (TO), indium tin oxide (ITO), a transparent conductive oxide (TCO), aluminum doped zinc oxide (AZO), or fluorine doped tin oxide (FTO).

21. The method of claim 1, wherein the capture probes each include a spatial barcode.

22. The method of claim 1, wherein the capture probes includes a capture domain to facilitate capture of a target analyte from the biological sample.

23. The method of claim 1, wherein the capture probes includes a unique molecular identifier (UMI) sequence.

24. The method of claim 1, wherein the analytes are magnified or demagnified from the first surface area covered by the selected one or more of the selectively actuated conductive regions to the different second surface area of the second substrate region.

* * * * *

UNITED STATES PATENT AND TRADEMARK OFFICE
CERTIFICATE OF CORRECTION

| | | |
|---|---|---|
| PATENT NO. | : 11,768,175 B1 | |
| APPLICATION NO. | : 17/192536 | |
| DATED | : September 26, 2023 | |
| INVENTOR(S) | : Hanyoup Kim, Augusto Manuel Tentori and Rajiv Bharadwaj | |

It is certified that error appears in the above-identified patent and that said Letters Patent is hereby corrected as shown below:

On the Title Page

Item (56), Column 2 (Other Publications), Line 1, delete "premeablizied" and insert
-- permeabilized --.

In the Claims

Column 30, Line 41-42, in Claim 1, after "regions" delete "first substrate region".

Signed and Sealed this
Fourteenth Day of November, 2023

*Katherine Kelly Vidal*

Katherine Kelly Vidal
*Director of the United States Patent and Trademark Office*